United States Patent
Uehara

(10) Patent No.: US 6,264,019 B1
(45) Date of Patent: Jul. 24, 2001

(54) CLUTCH COVER ASSEMBLY

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/457,301

(22) Filed: Dec. 9, 1999

(30) Foreign Application Priority Data

Dec. 18, 1999 (JP) ................................................. 10-361399

(51) Int. Cl.⁷ .................................................. F16D 13/75
(52) U.S. Cl. ..................................... 192/70.25; 192/111 A
(58) Field of Search ............................. 192/70.25, 111 A

(56) References Cited

U.S. PATENT DOCUMENTS

| 4,207,972 | 6/1980 | Zeidler ............................. | 192/111 A |
| 5,238,093 | 8/1993 | Campbell ........................... | 192/30 W |
| 5,320,205 | 6/1994 | Kummer et al. ................... | 192/70.25 |
| 5,431,268 | 7/1995 | Mizukami et al. ................ | 192/70.25 |
| 5,513,735 | 5/1996 | Uenohara ........................... | 192/111 A |
| 5,513,736 | 5/1996 | Mizukami ........................... | 192/111 A |
| 5,566,804 | 10/1996 | Gochenour et al. .............. | 192/70.25 |
| 5,568,852 | 10/1996 | Tomiyama ......................... | 192/70.25 |
| 5,634,541 | * 6/1997 | Maucher ........................... | 192/70.25 |
| 5,695,036 | 12/1997 | Gochenour et al. .............. | 192/70.25 |
| 5,791,448 | 8/1998 | Gochenour et al. .............. | 192/70.25 |
| 5,904,233 | * 5/1999 | Hashimoto ........................ | 192/70.25 |
| 5,971,126 | 10/1999 | Hashimoto ........................ | 192/70.25 |
| 6,024,199 | * 2/2000 | Uenohara et al. ................ | 192/70.25 |

FOREIGN PATENT DOCUMENTS

| 4306688 | 11/1993 | (DE) | ................................ F16D/13/75 |
| 4412107 | 11/1994 | (DE) | ................................ F16D/13/75 |
| 2606477 | 5/1988 | (FR) | ................................ F16D/13/75 |
| 2019957 | 11/1979 | (GB) | ................................ F16D/13/75 |
| 2261922 | 6/1993 | (GB) | ................................ F16D/13/75 |
| 2264989 | 9/1993 | (GB) | ................................ F16D/13/75 |
| 2284025 | 5/1995 | (GB) | ................................ F16D/13/75 |

* cited by examiner

Primary Examiner—Richard M. Lorence
(74) Attorney, Agent, or Firm—Shinjyu Global IP Counselors, LLP

(57) ABSTRACT

A clutch cover assembly 4 is provided to maintain accurately a desired amount of movement of a fulcrum on a clutch cover side of a pressing member moved in a wear compensating mechanism. The clutch cover assembly 4 includes a wear compensating mechanism 18. The wear compensating mechanism 18 has a biasing mechanism 31 for biasing the support ring 36 toward the clutch disk assembly 3, a stop mechanism 32 axially movably and frictionally engaged with a clutch cover, and a wear amount detecting mechanism 33. The stop mechanism 32 can stop the axial movement of the support ring 36 by receiving the biasing mechanism 31, and forms a space with respect to the biasing mechanism 31 by moving toward the clutch disk assembly 3 when wear occurs in the clutch disk assembly 3. The wear amount detecting mechanism 33 moves the stop mechanism 32 toward the clutch disk assembly 3 when the wear occurs, and thereby forms an axial space between the stop mechanism 32 and the biasing mechanism 31.

22 Claims, 22 Drawing Sheets

CLUTCH COVER ASSEMBLY

BACKGROUND OF THE INVENTION

1. Field of the Invention

This invention generally relates to a clutch cover assembly provided with a wear compensating mechanism. More specifically, the present invention relates to a wear compensating mechanism, which can operate when wear occurs on a friction member, and thereby moves a fulcrum of a pressing member toward the friction member in accordance with an amount of wear.

2. Background Information

A clutch cover assembly of a clutch device is attached to a flywheel of an engine. The clutch cover assembly operates to press a friction facing of a clutch disk assembly against the flywheel by an elastic force of a diaphragm spring or the like for transmitting a drive force of an engine to a transmission. In this clutch device, when the friction facing wears to a predetermined extent or wears beyond the predetermined extent, the friction facing cannot be used any longer. If use continues after such wear, the position of the diaphragm spring of the clutch cover assembly changes so that the pressing load disadvantageously changes. Therefore, the clutch disk assembly must be replaced with a new clutch disk assembly when the wear occurs to the predetermined extent or more. It has been desired to increase the use time of the clutch disk or the replacement cycle, and therefore the lifetime of the clutch.

For increasing the lifetime of the clutch, it is important to increase an effective service thickness of the friction facing in the clutch disk assembly. In view of this increased thickness, the friction facing is fixed to a cushioning plate without using a rivet or the like according to one of several known methods of attachment.

In the clutch cover assembly, it is necessary to return the attitude (orientation) of a spring such as a diaphragm spring to the initial attitude (orientation) when the friction facing is worn. Therefore, such a wear compensating mechanism is used that determines an amount of wear of the friction facing. The wear compensating mechanism can move a fulcrum (a fulcrum ring on the pressure plate side or a fulcrum mechanism on the clutch cover side) of the spring such as a diaphragm spring in accordance with the determined amount of wear. Thereby, the attitude (orientation) of the diaphragm spring or the like can be kept constant or maintained in an initial attitude (orientation) independently of the wear of the friction facing. Therefore, the friction facing of the clutch disk assembly can be used to the maximum extent.

In a clutch cover assembly disclosed in Japanese Laid-Open Patent Publication No. 8-170652, a pressing member for applying a pressing force to a pressure plate is formed of a spring and a lever member. The wear compensating mechanism is a mechanism for moving a fulcrum mechanism on the clutch cover side toward the friction facing in accordance with the amount of wear of the friction facing. This wear compensating mechanism is primarily formed of a support member, a biasing mechanism, and a friction detecting mechanism. The support member supports a fulcrum of a lever member on the clutch cover side. The biasing mechanism biases the support member toward the friction member. The friction detecting mechanism detects an amount of friction member wear and allows movement of the pressure plate toward the clutch cover in accordance with the amount of wear.

The biasing mechanism is formed of two ring members having several inclined surfaces, which are in complementary contact with each other, to form a wedge mechanism, and a spring for biasing the ring member on the clutch cover side in the rotating direction. The spring and wedge mechanism act to move the other ring member and a support member toward the friction member.

The friction detecting mechanism is formed of a cylindrical member which is axially movably and frictionally engaged with an aperture in the clutch cover, and a bolt which extends from the pressure plate. The bolt has a head in contact with a side of the cylindrical member remote from the friction member. An axial space corresponding to a release stroke of the pressure plate is maintained between the pressure plate and the cylindrical member. The pressure plate is always biased away from the friction member by a plurality of strap plates. When the biasing force of the diaphragm spring is released and therefore the clutch enters the clutch released state, the pressure plate moves away from the friction member, and comes into contact with a friction member side of the cylindrical member.

When the friction member wears, the pressure plate moves toward the flywheel. Furthermore, the pressure plate moves a bushing relative to the clutch cover by a distance corresponding to the amount of wear of the friction member. As a result, the axial distance between the pressure plate and the cylindrical member is the same as before the wearing of the friction member. When the clutch releasing operation is then performed, the cylindrical member stops the axial movement of the pressure plate. The position where the pressure plate stops is shifted by the amount of wear toward the friction member side from the position before wearing. Therefore, the axial space corresponding to the amount of wear of the friction member is formed between the pressure plate and the lever member. As a result, the biasing mechanism can move the support member in the axial direction, and the lever member comes into contact with the pressure plate when it moves a distance corresponding to the amount of wear.

According to the wear compensating mechanism in the foregoing conventional clutch cover assembly, the amount of wear is detected from the axial space between the pressure plate and the cylindrical member engaged with the clutch cover. The movement and stopping of the support member are performed between the support member and the pressure plate. According to this structure, the pressure plate is moved toward the friction member due to, e.g., vibrations applied thereto in the clutch releasing operation. An excessively large space is then formed between the pressure plate and the support member so that the support member may move a distance larger than the predetermined distance toward the pressure plate. When such over-adjusting occurs, the position of the spring applying a biasing force to the pressure plate changes from the initial state so that the pressing load cannot be constant.

In view of the above, there exists a need for a clutch cover assembly having a wear compensating mechanism which overcomes the above mentioned problems in the prior art. This invention addresses this need in the prior art as well as other needs, which will become apparent to those skilled in the art from this disclosure.

SUMMARY OF THE INVENTION

An object of the invention is to provide a wear compensating mechanism for compensating a friction member for wear by moving a support member on a clutch cover side. More specifically, the object is to provide a mechanism which can accurately ensure an intended amount of movement of the support member on the clutch cover side.

An object is to maintain precisely a desired amount of fulcrum movement on a clutch cover side of a pressing member that moves in a wear compensating mechanism.

According to a first aspect of the present invention, a clutch cover assembly is provided for coupling a clutch by biasing a friction member toward a friction surface of an input flywheel, and releasing the clutch by releasing the biasing. The clutch cover assembly includes a clutch cover, a pressure plate, a pressing member and a wear compensating mechanism. The clutch cover is fixedly coupled to the input flywheel for integral rotation, and is axially opposed to the friction member. The pressure plate is arranged axially between the clutch cover and the friction member. The pressing member is supported by the clutch cover, and applies a pressing force to the pressure plate from the clutch cover side. The wear compensating mechanism is provided for operating when wear occurs on the friction member, and thereby moving a fulcrum on the clutch cover side of the pressing member toward the friction member in accordance with the wear during a clutch releasing operation. The wear compensating mechanism has a biasing mechanism for biasing the fulcrum toward the friction member, a stop mechanism axially movably and frictionally engaged with the clutch cover, and a wear amount detecting mechanism. The stop mechanism can prevent axial movement of the fulcrum by receiving the biasing mechanism, and moves toward the friction member to form an axial space with respect to the biasing mechanism when wear occurs on the friction member.

According to this clutch cover assembly, when wear occurs on the friction member, the wear amount detecting mechanism moves the stop mechanism toward the friction member with respect to the clutch cover so that an axial space is formed between the stop mechanism and the biasing mechanism. When the clutch releasing operation is then performed, the fulcrum of the pressing member biased by the biasing mechanism moves toward the friction member. The fulcrum of the pressing member moves toward the friction member until the stop mechanism restricts the axial movement of the biasing mechanism. In the above operations, the axial space, in which the biasing mechanism can move the fulcrum of the pressing member, is formed between the stop mechanism engaged with the clutch cover and the biasing mechanism. Therefore, even when the pressure plate axially moves due to, e.g., vibrations applied to the pressure plate during the clutch releasing operation, the displacement of the pressure plate does not change the axial space. Thus, the amount of axial movement of the fulcrum of the pressing member is accurately kept.

According to a second aspect of the present invention, the clutch cover assembly of the first aspect further has a feature that the biasing mechanism has a support member and a drive member. The support member supports the clutch cover side of the pressing member. The drive member is arranged between the clutch cover and the support member for applying a force directed toward the friction member to the support member. The stop mechanism bears an axial load applied from the drive member, and forms an axial space with respect to the drive member.

According to this clutch cover assembly, when wear occurs on the friction member, the stop mechanism moves toward the friction member with respect to the clutch cover to form the axial space with respect to the drive member. When the clutch releasing operation is then performed, the support member is moved toward the friction member by the drive member. The support member moves toward the friction member until the stop mechanism restricts the axial movement of the drive member. In the above operations, the axial space in which the drive member can move the support member is formed between the stop mechanism engaged with the clutch cover and the drive member. Therefore, even if the pressure plate receives vibrations and thereby axially moves in the clutch releasing operation, the displacement of the pressure plate does not change the axial space. Thus, the amount of support member axial movement is accurately kept.

According to a third aspect of the present invention, the clutch cover assembly of the second aspect further has a feature that the drive member is provided on its drive member side with a first inclined surface extending in the circumferential direction. The drive member is rotatably supported on the friction member side of the clutch cover. The biasing mechanism further has a first inclined portion and a spring. The first inclined portion has a first complementary inclined surface in contact with the first inclined surface and is movable together with the support member. The spring biases the drive member in the rotating direction and thereby biases the first inclined portion and the support member toward the friction member. The stop mechanism inhibits rotation of the drive member, and allows the rotation of the drive member to move the support member toward the drive member when wear occurs on the friction member.

According to this clutch cover assembly, when wear occurs on the friction member, the stop mechanism moves toward the friction member with respect to the clutch cover, and thereby forms the axial space with respect to the drive member. When the clutch releasing operation is then performed, the spring rotates the drive member, and the drive member applies to the support member the axial component of the force occurring in a wedge structure formed of the first inclined surface of the drive member and the first complementary inclined surface. As a result, the support member moves toward the friction member. When the stop mechanism stops rotation of the drive member, the drive member no longer moves the support member in the axial direction. According to the above operation, the axial space in which the drive member can move the support member is formed between the stop mechanism engaged with the clutch cover and the drive member. Therefore, even when the pressure plate axially moves, e.g., due to vibrations applied to the pressure plate during the clutch releasing operation, the displacement of the pressure plate does not change the axial space. Thus, the amount of axial movement of the support member is accurately kept.

According to a fourth aspect of the present invention, the clutch cover assembly of the third aspect further has a feature that the drive member has a second inclined surface on the friction member side. The stop mechanism has a second inclined portion having a second complementary inclined surface in contact with the second inclined surface.

In this clutch cover assembly, the drive member has first and second inclined surfaces being in contact with the first and second inclined portions, respectively. Since the drive member has the two kinds of inclined surfaces described above, the distance which the drive member can axially move with respect to the second inclined portion can be different from the distance which the drive member concurrently and axially moves the first inclined portion and the support member. Thereby, the support member can be reliably moved to a desired axial position in view of the amount of wear.

According to a fifth aspect of the present invention, the clutch cover assembly of the fourth aspect further has a feature that the angle of the first inclined surface is different from that of the second inclined surface.

According to a sixth aspect of the present invention, the clutch cover assembly of the first, second, or third aspect further has a feature that the stop mechanism has an engagement member and a stop member. The engagement member is axially movably engaged with the clutch cover. The stop member is supported on its friction member side by the engagement member and is capable of bearing a load applied from the biasing mechanism. The wear amount detecting mechanism has an engagement portion capable of moving the engagement member toward the friction member when the pressure plate moves toward the friction member due to wearing of the friction member.

According to this clutch cover assembly, when the friction member wears, the engagement portion axially moves the engagement member with respect to the clutch cover in accordance with the amount of wear. As a result, the stop member axially moves to form the axial space with respect to the biasing mechanism.

According to a seventh aspect of the present invention, the clutch cover assembly of the fourth or fifth aspect further has a feature that the stop mechanism has an engagement member axially movably engaged with the clutch cover and supporting the friction member side of the second inclined portion. The wear amount detecting mechanism has an engagement portion capable of moving the engagement member toward the friction member side when the pressure plate moves toward the friction member due to the wear of the friction member.

In this clutch cover assembly, when the friction member wears, the engagement portion axially moves the engagement member with respect to the clutch cover in accordance with the wear amount. As a result, the stop mechanism moves axially to form the axial space with respect to the biasing mechanism.

According to an eighth aspect of the present invention, the clutch cover assembly of the seventh aspect further includes a withdrawing member for coupling the clutch cover to the pressure plate and biasing the pressure plate away from the friction member. The axial biasing force applied from the biasing mechanism to the support member is larger than the biasing force of the withdrawing member. When the drive member comes into contact with the stop member during the clutch releasing operation after wear occurs on the friction member, a resistance exerted from the clutch cover to the stop member occurs so that the support member stops.

In the clutch released state, an axial space is reliably formed between the engagement member and the pressure plate.

In this clutch cover assembly, when the biasing mechanism comes into contact with the stop member in the wear compensating operation during the clutch releasing operation, the resistance force applied from the clutch cover to the stop member stops the movement of the support member. At this time, the pressure plate is not in contact with the engagement member, and the space is axially maintained between them. Thus, the movement of the pressure plate away from the friction member is not restricted by the engagement member. This means that the stop mechanism does not restrict the release stroke of the pressure plate.

According to a ninth aspect of the present invention, a clutch cover assembly is provided for coupling a clutch by biasing a friction member toward a friction surface of an input flywheel, and releasing the clutch by releasing the biasing. The clutch cover assembly includes a clutch cover, a pressure plate, a lever member, a spring, and a wear compensating mechanism. The clutch cover is fixed to the input flywheel for integral rotation, and is axially opposed to the friction member. The pressure plate is arranged axially between the clutch cover and the friction member. The lever member is arranged axially between the clutch cover and the pressure plate. The lever member has a power point at a radially inner position, a fulcrum at a radially inner position and a point of application which can act on the pressure plate from the clutch cover side. The spring applies a force directed toward the friction member to the power point of the lever member supported by the clutch cover. The wear compensating mechanism is configured to move the fulcrum of the lever by a distance S toward the friction member when wear W occurs on the friction member. The wear compensating mechanism has a biasing mechanism, a wear amount detecting mechanism and a movement control mechanism. The biasing mechanism has a support member and a drive member. The support member is provided for supporting the clutch cover side of the fulcrum of the lever member. The drive member is provided for applying a biasing force to the support member. The biasing mechanism is provided for biasing the support member toward the friction member. The wear amount detecting mechanism has a detecting member being in contact with the friction member side of the drive member and forming a space corresponding to the amount of wear with respect to the drive member when wear occurs on the friction member. The movement control mechanism restricts the movement of the support member in the state where wear is not present on the friction member. The movement control mechanism also allows movement by a distance S of the support member before the drive member comes into contact with the detecting member, based on the wear amount W detected by the wear amount detecting mechanism. The distance S is obtained by multiplying the wear amount W of the friction member by a factor of $L_1/L_2$, where $L_1$ is a distance between the power point and the fulcrum, and $L_2$ is a distance from the power point to the point of application.

In this clutch cover assembly, when wear occurs on the friction member, the detecting member of the wear amount detecting mechanism forms a space corresponding to the amount of wear with respect to the drive member. When the clutch releasing operation is then performed, the support member moves toward the drive member until the axial movement of the drive member is restricted by the stop member. The movement control mechanism restricts the movement of the support member in the state where wear is not present on the friction member. The movement control mechanism also allows movement by the distance S of the support member before the drive member comes into contact with the detecting member, based on the wear amount W detected by the wear amount detecting mechanism. The distance S is obtained by multiplying the wear amount W of the friction member by the factor of $L_1/L_2$, where $L_1$ is the distance between the power point and the fulcrum, and $L_2$ is the distance from the power point to the point of application. Therefore, the axial height of the power point of the lever member does not change after compensation of the wear.

According to this clutch cover assembly, the axial space in which the drive member can move is formed between the detecting member engaged with the clutch cover and the drive member. Therefore, even if vibrations are applied to the pressure plate to move it in the axial direction during the clutch releasing operation, the displacement of the pressure plate does not change the axial space. Thus, the distance of axial movement of the support member is accurately maintained.

According to a tenth aspect of the present invention, the clutch cover assembly of the ninth aspect further has a feature that the drive member is provided on the drive member side with circumferentially extending first and second inclined surfaces, and a ratio θ1/θ2. The ratio θ1/θ2 between angles θ1 and θ2 of the first and second inclined surfaces is equal to a value obtained by multiplying $L_1/L_2$ by r1/r2, where r1 and r2 are mount radiuses of the first and second inclined surfaces, respectively. The biasing mechanism further has a spring member for biasing the drive member to rotate the drive member in the circumferential direction with respect to the support member and the detecting member. The support member has a first complementary inclined surface being in complementary contact with the first inclined surface, and the detecting member has a second complementary inclined surface being in complementary contact with the second inclined surface.

In this clutch cover assembly, a space is kept between the second inclined surface of the drive member and the second complementary inclined surface of the detecting member during the clutch releasing operation after wear occurs on the drive member. The drive member is rotated circumferentially by the spring member such that the first inclined surface pushes the first complementary inclined surface of the support member. Thereby, the support member moves toward the friction member. The distance by which the first inclined surface axially moves the support member before the second inclined surface of the drive member comes into contact with the second complementary inclined surface of the detecting member is equal to a value obtained by multiplying the wear amount W by $L_1/L_2$. As a result, the axial height of the power point of the lever member can be kept constant regardless of wear of the friction member.

According to an eleventh aspect of the present invention, the clutch cover assembly of the ninth or tenth aspect of the present invention further has a feature that the movement control mechanism has a movement stop mechanism for stopping further movement of the support member moved by the distance S.

According to a twelfth aspect of the present invention, the clutch cover assembly of the ninth or tenth aspect of the present invention further has a feature that the detecting member is axially movably and frictionally engaged with the clutch cover. The detecting member has a side being remote from the friction member and being in contact with a portion of the pressure plate. The detecting member is opposed to the pressure plate with a predetermined axial space therebetween.

As described above, the detecting member is engaged with the clutch cover, and moves together with the pressure plate when the pressure plate moves toward the input flywheel due to wear on the friction member.

According to a thirteenth aspect of the present invention, the clutch cover assembly of the ninth or tenth aspect of the present invention further has a feature that the detecting member has first and second members. The first member is in contact with the drive member. The second member is arranged on the friction member side with respect to the first member. The second member is axially movably and frictionally engaged with the clutch cover. The second member supports the friction member side of the first member. The second member can receive a load applied from a side remote from the friction member by a portion of the pressure plate. The second member is axially spaced from the pressure plate by a predetermined distance.

According to a fourteenth aspect of the present invention, the clutch cover assembly of the thirteenth aspect of the present invention further has a feature that the portion of the pressure plate is a projection. The projection extends from the pressure plate away from the friction member and has an end at its tip end. The fourteenth aspect of the present invention also has a feature that the second member is a cylindrical member arranged around the projection with a space therebetween, and has an outer peripheral surface frictionally engaged with an aperture formed in the clutch cover.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
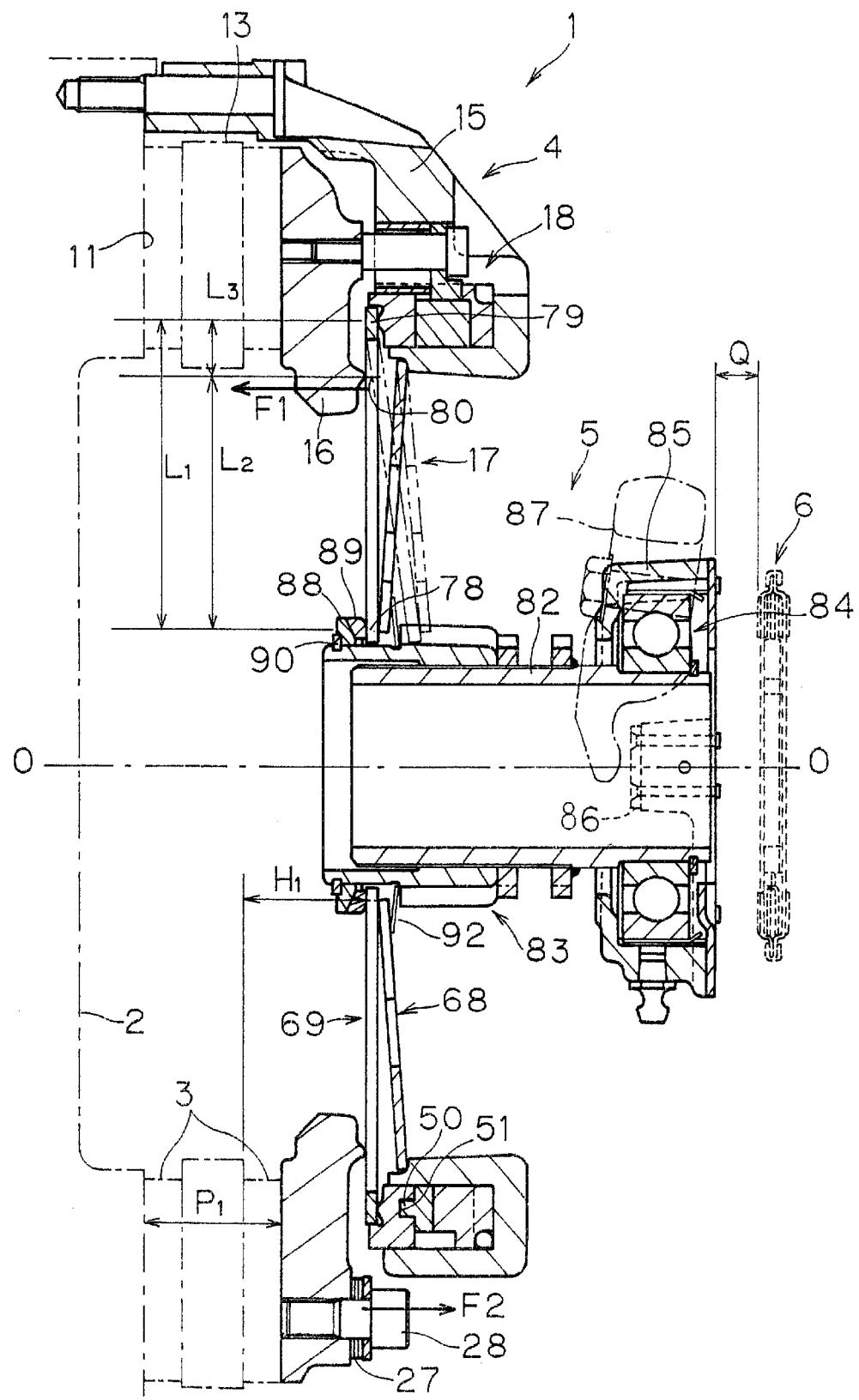
FIG. 1 is a schematic cross sectional view of a clutch device employing a clutch cover assembly of in accordance with a first embodiment of the present invention.
Figure 2:
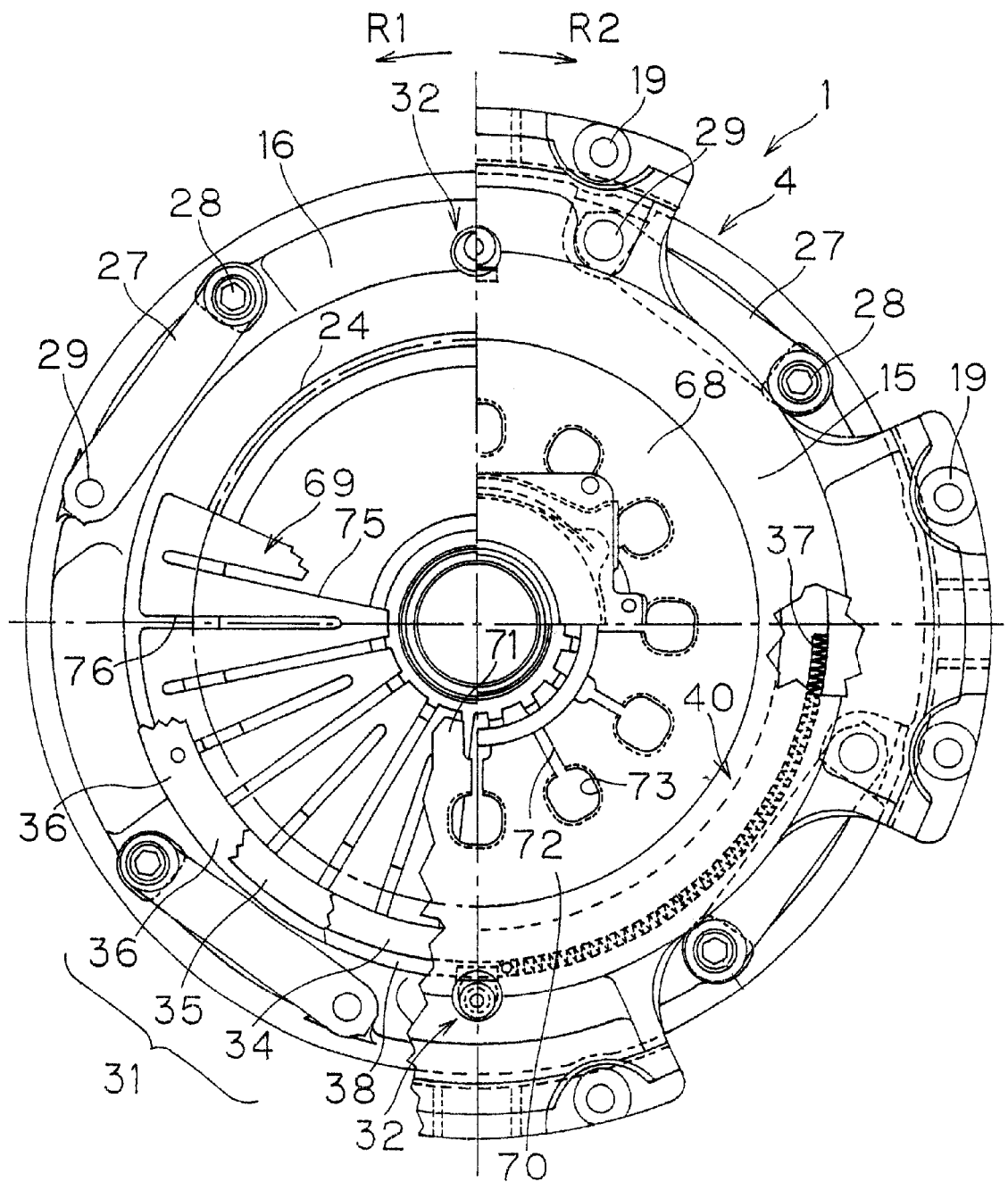
FIG. 2 is an elevational view of the clutch device illustrated in FIG. 1 in accordance with a first embodiment of the present invention with selected portions fragmented for purposes of illustration.

FIGS. 1 and 2 show a basic structure of a clutch device 1, which can employ an embodiment of the invention. The clutch device 1 is employed in a vehicle, and particularly in a large vehicle such as a truck. The clutch device 1 is primarily formed of a flywheel 2 on an input side, a clutch disk assembly 3, a clutch cover assembly 4 and a release device 5. In FIG. 1, line O—O indicates a rotation axis of the clutch device 1. The left side in FIG. 1 is a first axial side (engine side), and the right side in FIG. 1 is a second axial side (transmission side). An arrow R1 in FIG. 2 indicates a rotating direction of the clutch device 1, and an arrow R2 indicates a reverse direction and also indicates a rotating direction of a ramp ring 34 in a wear compensating mechanism 18, which will be described later.

FIGS. 1 to 6 show various positions and attitudes of respective members when the clutch device 1 is in an engaged state. The transmission combined with the clutch device 1 does not have a synchronizer, and therefore, is provided with a clutch brake 6.

The flywheel 2 is a circular member that can be attached to an end of a crankshaft (not shown) of an engine. The flywheel 2 has an annular and flat friction surface 11 located on the second axial side of its outer peripheral portion.

The clutch disk assembly 3 is located adjacent to the second axial side of the flywheel 2. The clutch disk assembly 3 is a device, which can be coupled to the flywheel 2 to transmit a torque from the crankshaft of the engine to an input shaft of a transmission (not shown). In this structure, two clutch disk assemblies 3 are used. Each of the clutch disk assemblies 3 is not shown, except for their friction facings located at their outer peripheral portions. One of the friction facings of one of the clutch disk assemblies 3 is located adjacent a friction surface 11 of the flywheel 2. The oppositely directed friction facing of the other clutch disk assembly 3 is located adjacent the first axial side from the pressure plate 16. An intermediate plate 13 is arranged axially between the opposed friction facings of the clutch disk assemblies 3. The intermediate member 13 is unrotatable and axially movable with respect to a clutch cover 15, which will be described later. Each clutch disk assembly 3 is provided at its radially inner or central portion with a hub (not shown) which is engaged with the input shaft (not shown) extending from the transmission.

Figure 4:
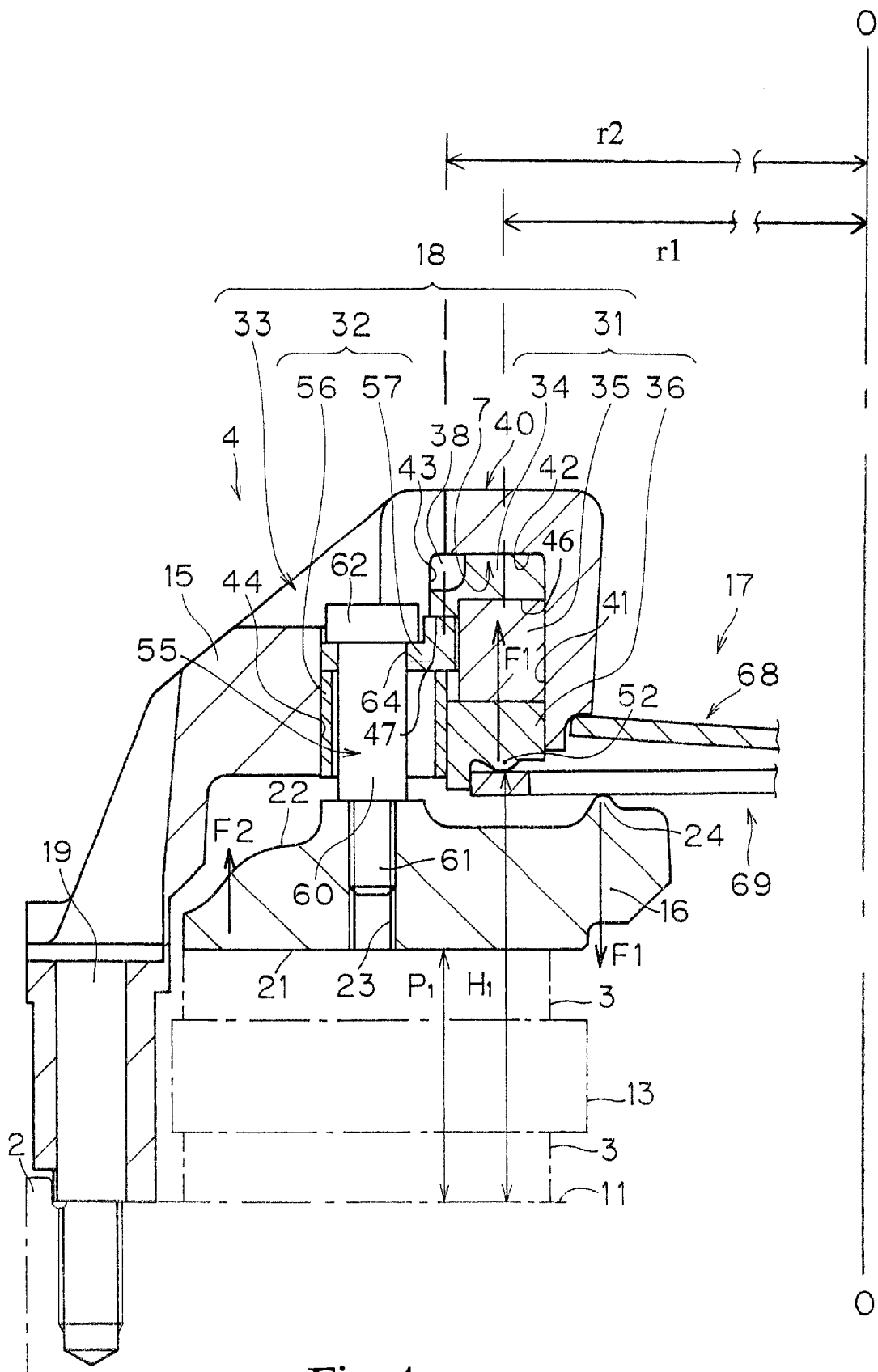
FIG. 4 is a schematic fragmentary cross sectional view of the clutch cover assembly, and shows, on an enlarged scale, a portion of the structure in FIG. 1.

The clutch cover assembly 4 is a device for transmitting or intercepting the torque of the flywheel 2 of the engine to the clutch disk assemblies 3. The clutch cover assembly 4 is fixedly and rigidly attached to the flywheel 2 by bolts or the like. The clutch cover assembly 4 is primarily formed of, as shown in FIG. 4, the clutch cover 15, a pressure plate 16, a pressing member 17 and a wear compensating mechanism 18.

The clutch cover 15 is an annular member fixedly coupled to the flywheel 2. More specifically, the outer peripheral portion of the clutch cover 15 is fixedly coupled to the flywheel 2 by bolts 19. The clutch cover 15 covers the outer periphery of the clutch disk assembly 3, and is located on the second axial side of the clutch disk assembly 3. In this manner, the clutch cover 15 is axially opposed to the friction surface 11 of the flywheel 2. As shown in FIG. 4, the clutch cover 15 is provided with an accommodating portion 40 for receiving a biasing mechanism 31 of the wear compensating mechanism 18, which will be described later. The accommodating portion 40 projects in the second axial direction compared with its outer peripheral portion. The accommodating portion 40 has an annular groove 7 on its first axial side. The groove 7 is formed by an inner peripheral wall 41, a second axial side surface 42 and an outer peripheral wall 43. The clutch cover 15 has two circular apertures 44 extending axially through the cover 15. In this embodiment, the apertures 44 are arranged in the diametrally opposed two positions, respectively, for accommodating portions of stop mechanism 32 of the wear compensation mechanism 18.

The pressure plate 16 is an annular member, which is located radially inside the clutch cover 15 and axially between the friction facing of the clutch disk assembly 3 on the second axial side and the clutch cover 15. The surface on the first axial side of the pressure plate 16 forms an annular flat pressing surface 21. The pressure plate 16 is provided at its second axial side with a surface 22 opposed to the clutch cover 15. The opposed surface 22 is provided at its radially middle portion with a pair of threaded bolt apertures 23 located in circumferential positions corresponding to the apertures 44, respectively. An annular support portion 24 is formed radially inside the opposed surface 22 and the bolt apertures 23. The support portion 24 projects in the second axial direction beyond the other portions of pressure plate 16.

Figure 3:
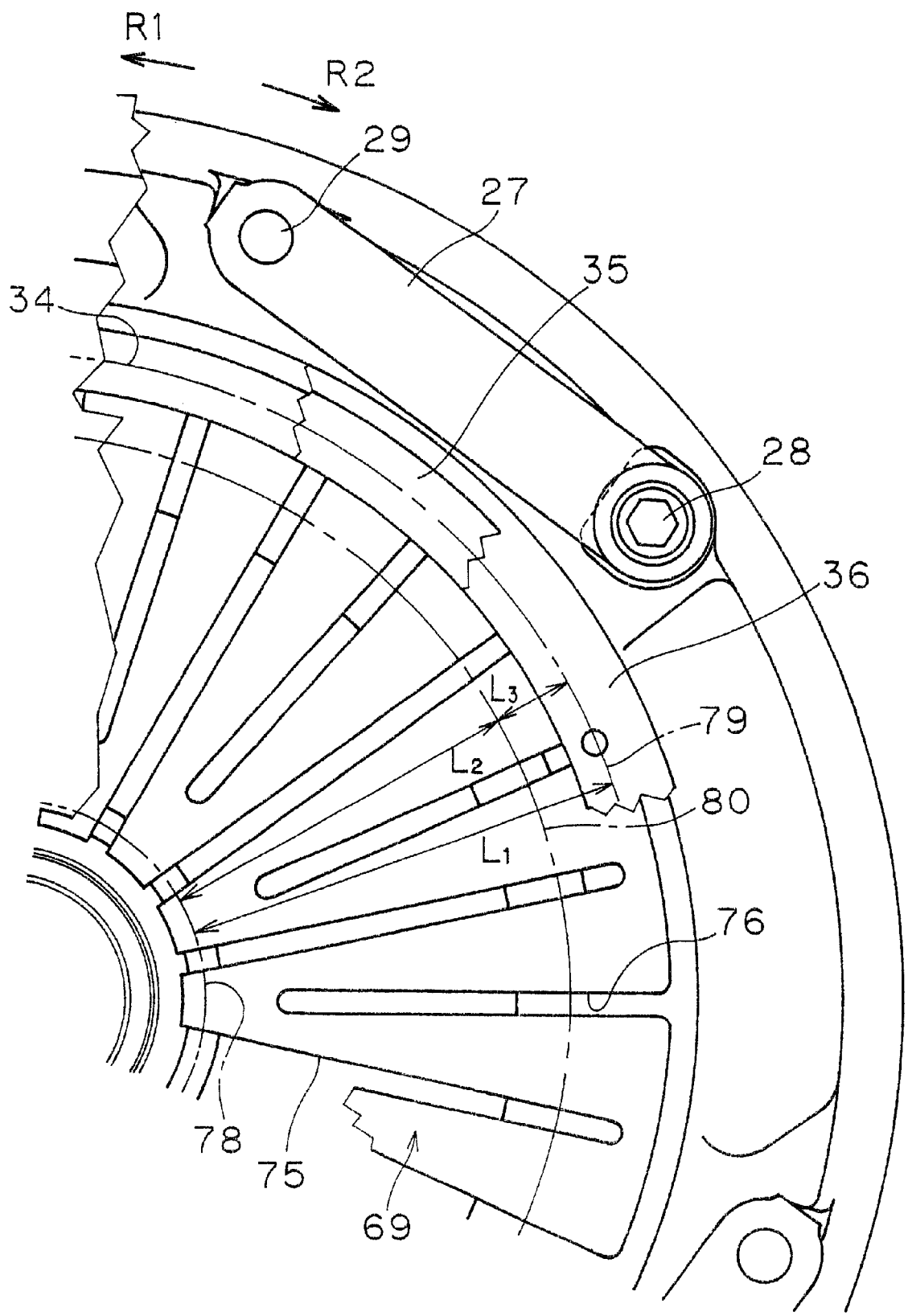
FIG. 3 is a fragmentary elevational view, on an enlarged scale, of the structure in FIG. 2 in accordance with a first embodiment of the present invention.

The pressure plate 16 is movably coupled to the clutch cover 15 by strap plates 27 for movement in the axial direction. More specifically, as shown in FIGS. 2 and 3, the strap plates 27 are arranged at four positions, which are circumferentially and equally spaced from each other. Each strap plate 27 is fixed at its one end (the R2-side) to the outer peripheral portion of the pressure plate 16 by a bolt 28, and is fixed at its other end (R1-side) to the clutch cover 15 by a bolt 29. Owing to this coupling, the pressure plate 16 can rotate in the RI direction together with the clutch cover 15. In the clutch engaged state, the strap plates 27 are axially bent to apply a biasing force directed toward the second axial side, and thus, toward the clutch cover 15 to the pressure plate 16.

The pressing member 17 is a member for applying a pressing force for clutch engagement to the pressure plate 16. The pressing member 17 is formed of a diaphragm spring 68 and a lever member 69. The diaphragm spring 68 is a circular and annular member, and has an annular portion 70 and a plurality of lever portions 71 extending radially inward from the annular portion 70. The lever portions 71 are preferably defined by slits 72. As seen in FIG. 2, apertures 73 having a circumferentially larger width than the slits 72 are formed radially outside slits 72.

The lever member 69 is a circular and annular plate member. The lever member 69 has a flat form as a whole. As shown best in FIGS. 2 and 3, the lever member 69 is provided with a plurality of first slits 75 and a plurality of second slits 76. The first slits 75 extend from the inner periphery of the lever member 69 to an area near its outer periphery. The second slits 76 are located circumferentially between the neighboring first slits 75 and extends from the outer periphery of the lever member 69 to a region near its inner periphery. Since the first and second slits 75 and 76 are formed in circumferentially alternate positions, as described above, the lever member 69 can have the minimum but required rigidity. Alternatively, the lever member 69 can be formed of a plurality of members, which are radially arranged.

The relative positions of the diaphragm spring 68 and the lever member 69 will now be described in more detail. The lever member 69 has an outer peripheral portion, which is arranged axially between the pressure plate 16 and the clutch cover 15 (particularly, the accommodating portion 40). The surface on the second axial side of the outer peripheral portion of the lever member 69 is supported by a support ring 36, which will be described later. The lever member 69 is supported by the support portion 24 of the pressure plate 16 on its first axial side surface. The diaphragm spring 68 is located on the second axial side of the lever member 69. The outer diameter of the diaphragm spring 68 is smaller than the outer diameter of the lever member 69, but the inner diameter of the diaphragm spring 68 is substantially equal to or slightly smaller than the inner diameter of the lever member 69. The outer peripheral portion of the diaphragm spring 68 is supported by the clutch cover 15 on its second axial side. Particularly, the inner peripheral wall 41 of the accommodating portion 40 has a circular ledge that receives the outer peripheral portion of the diaphragm spring 68. The radially inner end of the diaphragm spring 68 contacts the second axial side surface of the radially inner end of the lever portion 69.

In this state, the diaphragm spring 68 applies a pressing force to the pressure plate 16 via the lever member 69. The pressing force applied from the diaphragm spring 68 is increased by a predetermined magnitude owing to the lever member 69, and is transmitted to the pressure plate 16. More specifically, the lever member 69 has a power point 78 at its radially inner portion, a point 80 of application at its middle portion, and a fulcrum point 79 at its outer portion. The diaphragm spring 68 acts on the power point 78 of the lever member 69. The point 80 of application of the lever member 69 is the point where the lever member 69 contacts support portion 24 of the pressure plate 16 to apply a force to the pressure plate 16 from the diaphragm spring 68. The fulcrum point 79 of the lever member 69 is the point where lever member 69 is supported on the clutch cover side 15, i.e., supported on support ring 36. The points 78, 79 and 80 are concentrically arranged. The radial distance from the power point 78 to the fulcrum 79 is equal to $L_1$. The radial distance from the power point 78 to the point of application 80 is equal to $L_2$. The radial distance from the point of application 80 to the fulcrum 79 is equal to $L_3$. Thereby, the pressing load transmitted from the diaphragm spring 68 to the lever member 69 is increased by $(L_2/L_3)$-fold when it is transmitted to the pressure plate 16.

Figure 5:
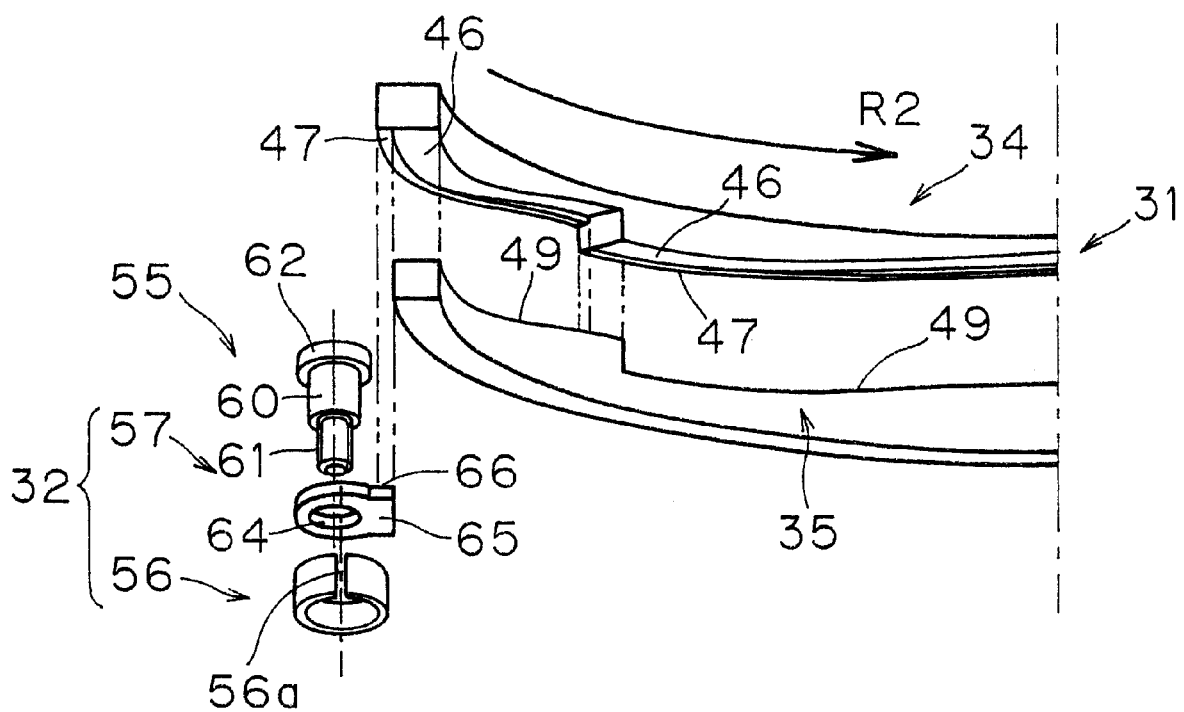
FIG. 5 is an exploded fragmentary perspective view showing relationships between respective parts of a wear compensating mechanism.
Figure 6:
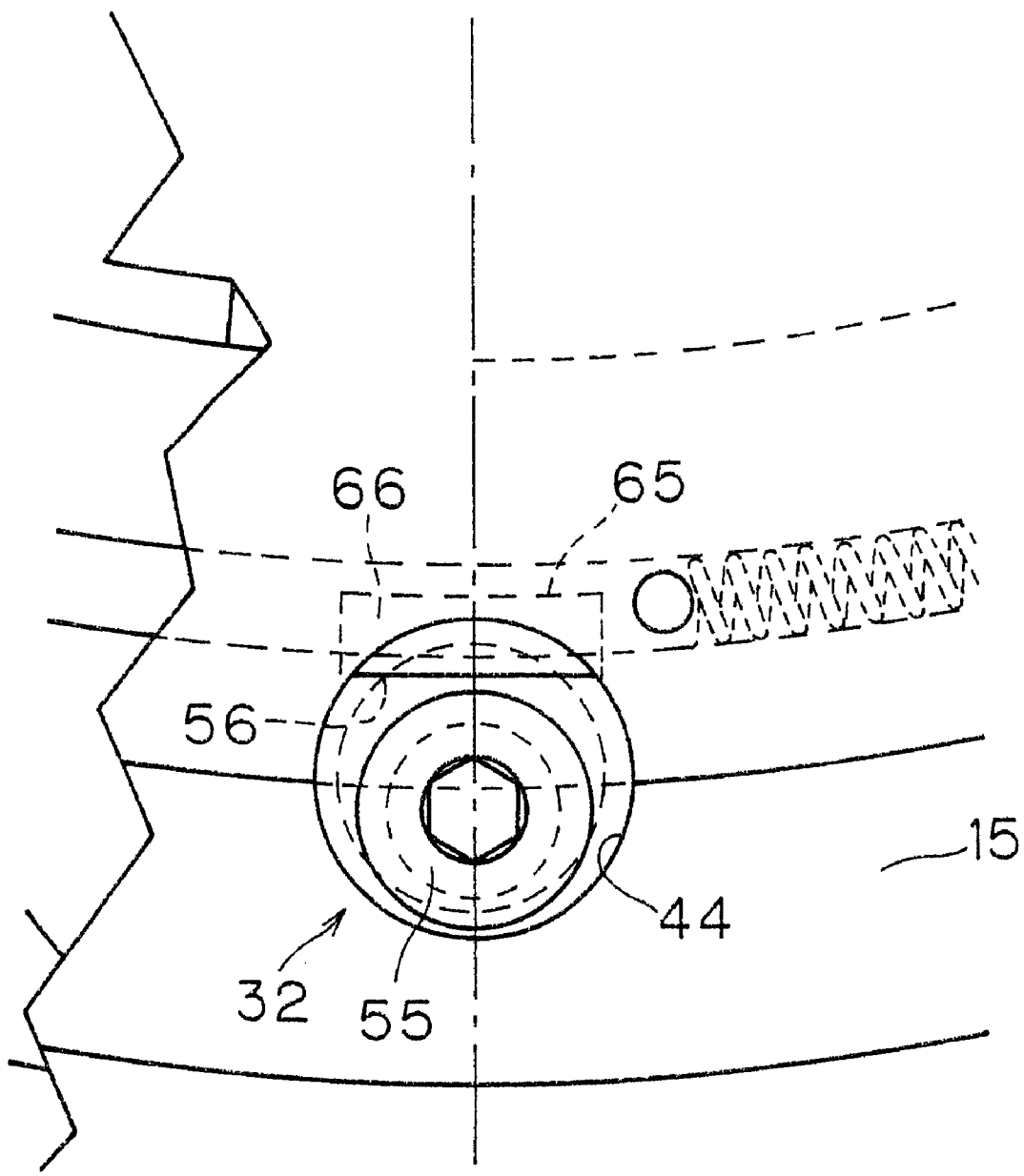
FIG. 6 is a fragmentary elevational view, on an enlarged scale, of a portion of the structure in FIG. 2.

The wear compensating mechanism 18 will now be described in more detail. As best shown in FIGS. 4 to 6, the wear compensating mechanism 18 is provided for the purpose of returning the axial height of the inner peripheral tip end of the lever member 69, i.e., the power point 78, to the initial height when the friction facings of the clutch disk assemblies 3 are worn. When wear occurs on the friction facings of the clutch disk assemblies 3, the wear compensating mechanism 18 moves the fulcrum point 79 on the clutch cover side of the lever member 69 by a distance corresponding to the wear of the friction facings. The wear compensating mechanism 18 is primarily formed of a biasing mechanism 31, a stop mechanism 32 and a wear amount detecting mechanism 33, as seen in FIG. 4.

The biasing mechanism 31 is a mechanism in which the support ring 36, which will be described later, is biased by a constant force in the first axial direction, i.e., toward the clutch disk assemblies 3. The stop mechanism 32 restricts the movement of the support ring 36 by receiving the force applied from the biasing mechanism 31. The wear amount detecting mechanism 33 is provided for moving the stop mechanism 32 toward the friction facings in response to wear of the friction facings of the clutch assemblies, and thereby allowing the axial movement of the support ring 36 by the biasing mechanism 31 when the friction facings of the clutch disk assemblies 3 wears. The stop mechanism 32 and the wear amount detecting mechanism 33 can be considered as the movement control mechanism, which restricts the movement of the support ring 36 by receiving the biasing force of the biasing mechanism 31. The stop mechanism 32 and the wear amount detecting mechanism 33 allows the movement of the support ring 36 in accordance with the amount of wear when the wear occurs on the friction facing.

The biasing mechanism 31 is arranged within the groove 7 of the clutch cover 15. The biasing mechanism 31 is primarily formed of a ramp ring 34, an inner ring 35 and a support ring 36. The ramp ring 34 is an annular member, which contacts the surface 42 on the second axial side of the groove 7. The ramp ring 34 is rotatably supported in the groove 7. The inner peripheral surface of the ramp ring 34 is supported on the inner peripheral wall 41 of the accommodating portion 40. The outer peripheral surface of ramp ring 34 is supported by an outer peripheral wall 43. The ramp ring 34 is provided with a spring accommodating portion 38 formed within the accommodating portion 40 and extending in an arc-shaped form. Coil springs 37 (FIG. 2) extend in the arc-shaped form within the spring accommodating portion 38. The R2-side ends of the coil springs 37 are fixedly coupled to the clutch cover 15, and the R1-side ends of the coil springs 37 are fixedly coupled to the ramp ring 34. By the pulling action of the coil springs 37, the ramp ring 34 is always biased to rotate in the R2 direction with respect to the clutch cover 15. As described above, the coil springs 37 are arranged to operate between the clutch cover 15 and the ramp ring 34. The coil springs 37 are not arranged between the ramp ring 34 and the inner ring 35. Therefore, the number and area of first and second inclined surfaces 46 and 47 can be increased, as will be described later.

Figure 11:
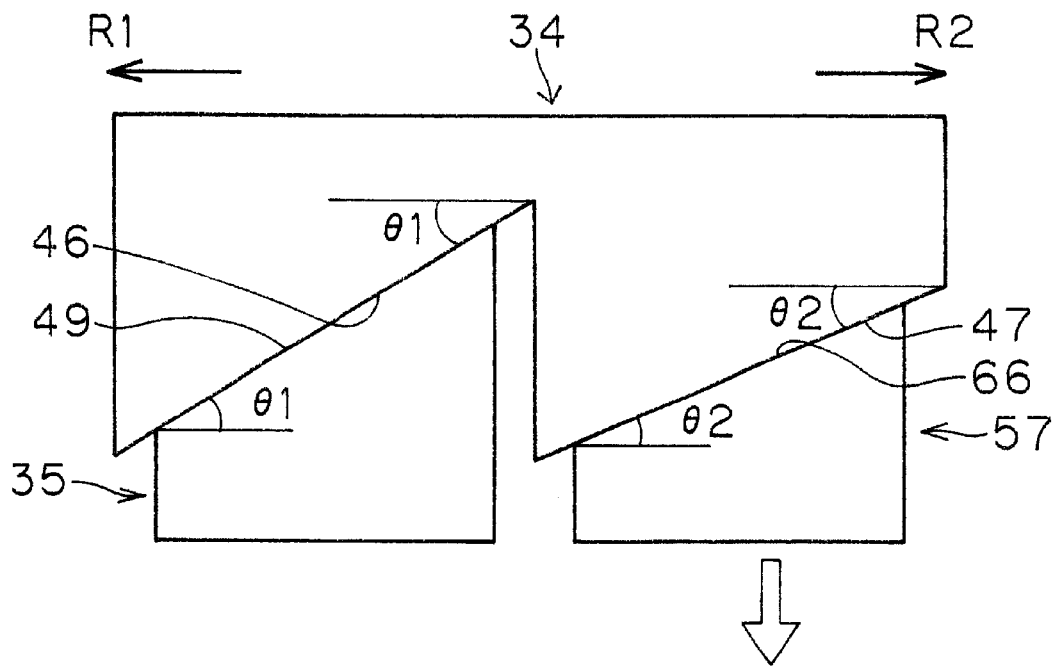
FIGS. 11 to 13 are diagrammatic views showing relationships and operations relating to first and second wedge mechanisms of the wear compensating mechanism.

As shown in FIG. 5, the ramp ring 34 is provided on the first axial side with first and second inclined surfaces 46 and 47. The first inclined surfaces 46 are formed on the radially inner side, and the second inclined surfaces 47 are formed on the radially outer side. The first inclined surfaces 46 are circumferentially spaced from each other, and the second inclined surfaces 47 are circumferentially spaced from each other. The first inclined surfaces 46 are radially wider than the second inclined surfaces 47. Each of the first and second inclined surfaces 46 and 47 are angled toward the clutch cover 15 in the direction R2. As shown in FIG. 11, an inclination angle θ1 of the first inclined surface 46 is larger than an inclination angle θ2 of the second inclined surface 47. A ratio of θ1/θ2 is equal to a value obtained by multiplying a ratio $L_1/L_2$ of the lever member 69 by r1/r2. In this formula, r1 represents a mount radius of the first inclined surface 46, and r2 represents a mount radius of the second inclined surface 47. The foregoing inclination angles are determined with respect to a plane perpendicular to the rotation axis O—O of the clutch device 1 (see FIG. 11).

The inner ring 35 contacts with the first axial side of the ramp ring 34. The inner ring 35 has an inner peripheral surface in contact with the inner peripheral wall 41. The inner ring 35 is provided at its second axial side surface with a plurality of complementary inclined surfaces 49. The first complementary inclined surfaces 49 are complementary in form to the first inclined surfaces 46 of the ramp ring 34. The inclined surfaces 46 and 49 contact each other. Thus, the first inclined surface 46 of the ramp ring 34 and the first complementary inclined surface 49 of the inner ring 35 form a first wedge mechanism. The first axial side surface of the inner ring 35 is perpendicular to the rotation axis O—O of the clutch device 1, and is provided with a plurality of circumferentially aligned projections 51 as seen in FIG. 1.

The support ring 36 is arranged in contact with the first axial side of the inner ring 35. The support ring 36 is provided at the surface on the second axial side with apertures 50 fitted with the projections 51, respectively, as seen in FIG. 1. Owing to the engagement of the projections 51 and the apertures 50, the inner ring 35 and the support ring 36 can rotate together with each other. The inner peripheral surface of the support ring 36 is supported by the inner peripheral wall 41 of the clutch cover 15. The support ring 36 is provided at its first axial side with an annular support projection 52 as seen in FIG. 4. The support projection 52 is in contact with the fulcrum point 79 of the lever member 69. Alternatively, the inner ring 35 and the support ring 36 can be made of a single member. Thus, the ring member having the support projection 52 can be provided with the plurality of inclined portions 49.

In summary, the support member formed of the inner ring 35 and the support ring 36 is supported radially unmovably and axially movably in the groove 7 of the clutch cover 15. This support member is circumferentially unrotatably engaged with the clutch cover 15, as will be described later.

In the first wedge mechanism formed of the first inclined surface 46 and the first complementary inclined surface 49, each of the inclined surfaces 46 and 49 is configured such that the R2 side in the rotating direction is shifted toward the second axial side with respect to the R1 side. Accordingly, the inner ring 35 and the support ring 36 are always biased toward the flywheel 2 by an axial component of the force. The force is exerted from the first inclined surface 46 of the ramp ring 34 to the inner ring 35 as a result of the biasing by the coil springs 37.

The stop mechanism 32 is arranged in each aperture 44 of the clutch cover 15. The stop mechanism 32 is primarily formed of a bushing 56 and a washer 57. The bushing 56 is a cylindrical member frictionally retained in one of the apertures 44. As shown in FIG. 5, the bushing 56 has an axial slit 56a, which is brought into contact with the inner peripheral surface of the aperture 44 by its own expanding force. The bushing 56 is frictionally engaged with the clutch cover 15. The bushing 56 does not move with respect to the clutch cover 15 until a force acting thereon exceeds the maximum resistance force occurring therebetween. In the state shown in FIG. 4, a predetermined space is kept between the first axial end surface of the bushing 56 and the opposed surface 22 of the pressure plate 16. This predetermined space is likewise kept in the clutch released state (FIG. 8) so that the bushing 56 is not in contact with the pressure plate 16.

The washer 57 is in contact with the end surface on the first axial side of the bushing 56. The washer 57 is a circular member, which is provided with a circular aperture 64. The circular portion of the washer 57 is in contact with and supported by the aperture 44, and is circumferentially unmovable with respect to the clutch cover 15. In this state, the washer 57 is axially movable with respect to the aperture 44. Further, as seen in FIG. 5, the washer 57 is provided at its portion with a projection 65, which is located radially inside the clutch cover assembly 4 and projects radially inward of the circular portion. The projection 65 is provided at its second axial side with a second complementary inclined surface 66, which is in contact with the second inclined surface 47 of the ramp ring 34. The second inclined surface 47 and the second complementary inclined surface 66 form a second wedge mechanism.

When the ramp ring 34 applies an axial force to the washer 57 and the bushing 56, a resistance force is applied from the aperture 44 of the clutch cover 15 to the bushing 56. In other words, the bushing 56 and the washer 57 are axially movably and frictionally engaged with the clutch cover assembly 4, and function as the stop mechanism 32 for supporting the load of the biasing mechanism 31. The forms, structures, arrangements and other features of the above members are not restricted to those of this embodiment described above provided that the above function can be achieved. Further, the stop mechanism can include another member in addition to the above structure.

In summary, the stop mechanism 32 is different from a mechanism, which is employed in the prior art for stopping the axial movement of the pressure plate with respect to the clutch cover. The stop mechanism is a mechanism which can stop the biasing mechanism 31 for linearly driving the support ring 36. More specifically, the stop mechanism 32 stops the rotation of the ramp ring 34 applying the axial force to the support ring 36, and thereby stops the biasing mechanism 31. Further, the stop mechanism 32 forms the second wedge mechanism between it and the ramp ring 34 so that the stop mechanism 32 can selectively inhibit and allow rotation of the ramp ring 34. The stop mechanism 32 is also a mechanism for forming a space, in which the biasing mechanism 31 can operate, with respect to the biasing mechanism 31. This space is determined only by the positional relationship between the stop mechanism 32 and the biasing mechanism 31 both supported on the clutch cover 15. This space (i.e., an amount of allowed movement of the support ring 36) is not affected by the position and motion of the pressure plate 16 as well as a size of the space between the support ring 36 and the lever member 69.

The ramp ring 34 has the first inclined surface 46 for axially biasing the support ring 36, and the second inclined surface 47 for controlling rotation by the stop mechanism 32 in accordance with the wear amount in the friction facings of the clutch disk assemblies 3. These inclined surfaces 46 and 47 are independent portions, and therefore the inclination angles thereof can be different from each other. Before the ramp ring 34 comes into contact with the stop mechanism 32, the ramp ring 34 rotates under the force of the coil spring 37 which in turn axially moves inner ring 35 and support ring 36. The axial distance that second inclined surfaces 47 move, which is equal to the amount of wear, can be different from the axial distance that the first inclined surface 46 moves, which is equal to the axial distance of movement of the support ring 36.

The wear amount detecting mechanism 33 is provided for moving the stop mechanism 32 toward the clutch disk assembly 3 with respect to the clutch cover 15 when the wear occurs in the clutch disk assemblies 3. In this embodiment, the wear amount detecting mechanisms 33 are in the form of bolt 55. Each bolt 55 has a body 60, a threaded portion 61 and a head 62. The center of the bolt 55 is shifted radially outward from the aperture 44. The main body 60 is primarily arranged within the aperture 44, and is spaced from the bushing 56. The main body 60 is fitted into the aperture 64 of the washer 57 so that the washer 57 is movable only in the axial direction with respect to the bolt 55. The threaded portion 61 is engaged with the bolt aperture 23 of the pressure plate 16. The head 62 of the bolt 55 is in contact with the surface on the first axial side of the washer 57. As described above, the bolts 55 can move in the first axial direction together with the pressure plate 16, and can act on the stop mechanism 32 only from the first axial side.

The support ring 36 has an engagement portion (not shown) which is engaged with the circumferentially opposite sides of the bushings 56. Thereby, the support ring 36 and the inner ring 35 are unrotatable in the circumferential direction of the clutch cover 15 with respect to the bushing 56 and therefore the clutch cover 15.

The release device 5 shown in FIG. 1 is provided for releasing the coupled state of the clutch device 1 by pulling the radially inner end of the lever member 69 toward the second axial side, and is primarily formed of a first sleeve 82 and a release bearing 84. The first sleeve 82 is a cylindrical member which is arranged radially outside the transmission input shaft (not shown). A second sleeve 83 is arranged around the outer peripheral surface of the portion on the first axial side of the first sleeve 82. Support members 88, 89 and 90 are arranged on the outer peripheral surface of the end of the second sleeve 83 for supporting the first axial side of the end, i.e., the power point 78 of the lever member 69. The second sleeve 83 supports an end of a conical spring 92. The other end thereof biases the inner periphery of the diaphragm spring 68 toward the lever member 69 so that they are always in contact with each other.

The release bearing 84 is arranged around the end on the second axial side of the first sleeve 82. The inner race of the release bearing 84 is fixed to the first sleeve 82. An outer peripheral wall 85 is fixedly coupled to the outer race of the release bearing 84. The outer peripheral wall 85 is provided at diametrally opposed two positions with engagement portions 86, respectively. A release fork 87 is swingably supported by supporting means (not shown) attached to the clutch housing (not shown), and is coupled to the clutch operating mechanism (not shown). The end of the release fork 87 is located on the first axial side with respect to the engagement portion 86 of the outer peripheral wall 85 with a predetermined space therebetween.

Further, the clutch brake 6 is arranged on the wall surface of the transmission housing (not shown). A space Q is kept between the clutch brake 6 and the release bearing 84. The clutch brake 6 is a mechanism provided for smooth shifting of the transmission. The clutch brake 6 is pinched between the wall of the transmission housing and the release device 5 which is in the end position on the second axial side within the movable range, and thereby can stop the rotation of the transmission input shaft (not shown).

In the clutch coupled state shown in FIG. 4, the lever member 69 applies a pressing force F1 to the pressure plate 16. In this state, the strap plates 27 apply a biasing force F2 that acts to move the clutch disk assembly 3 away from the pressure plate 16. Thus, a force obtained by subtracting the biasing force F2 from the pressing force F1 is exerted from the pressure plate 16 to the clutch disk assembly 3. In this state, the support ring 36 and the bushing 56 do not axially move.

In this state, the axial distance (axial height of the end of the lever member 69) equal to H1 is kept between the friction surface 11 and the inner peripheral end, i.e., the power point 78 of the lever member 69. In the initial state, the lever member 69 has a flat form so that the axial distance (the axial height of the fulcrum on the clutch cover side of the pressing member 17) of H1 is kept between the support projection 52 of the support ring 36 and the friction surface 11. It is also assumed that an axial distance (axial height of the pressing surface 21) equal to $P_1$ is kept between the friction surface 11 of the flywheel 2 and the pressing surface 21 of the pressure plate 16.

Figure 12:
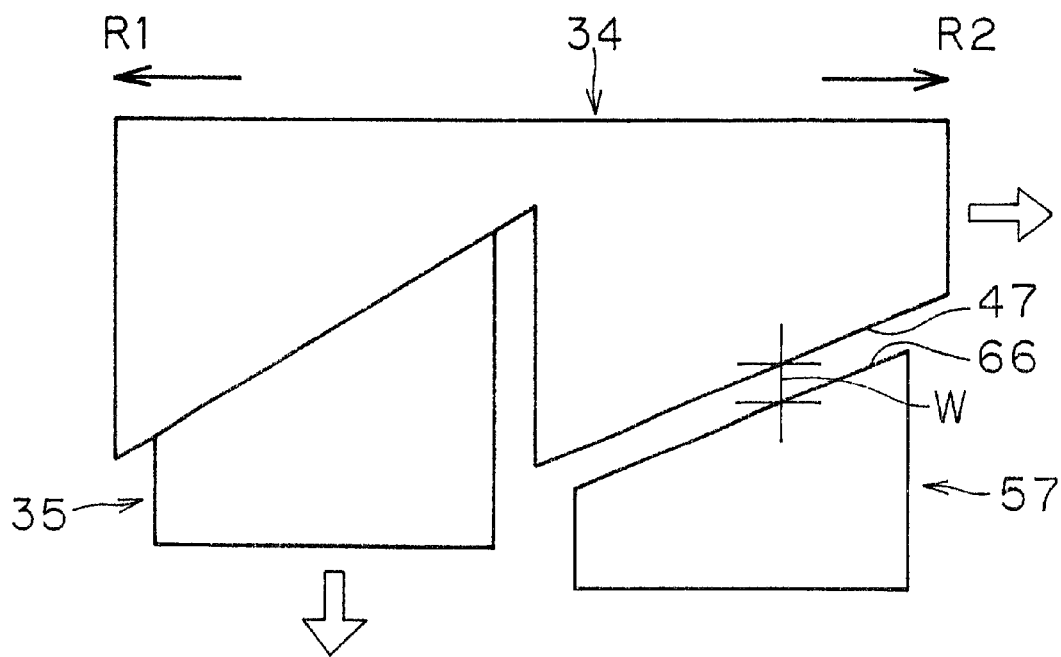
Figure 13:
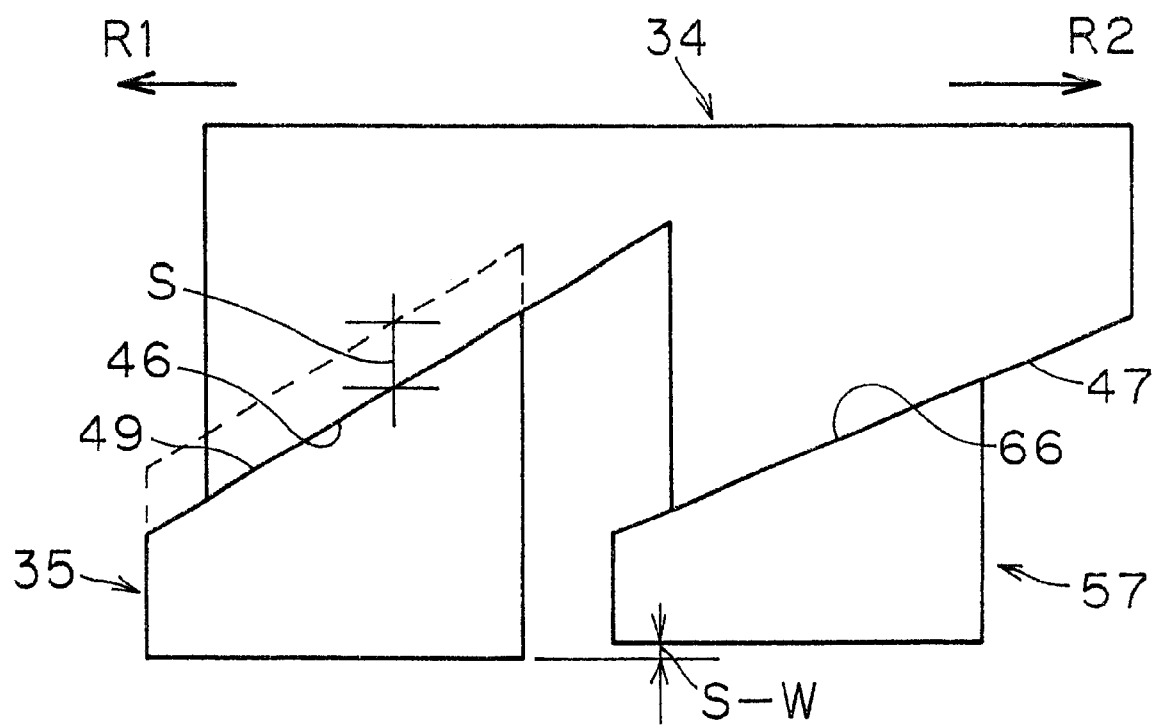

Description is now given on the wear compensating operation which is performed when wear occurs in the clutch disk assembly 3 combined with the clutch cover assembly 4. FIGS. 4 and 7–10 are cross sectional views of the practical clutch cover assembly 4. FIGS. 11 to 13 are diagrammatic views showing relationships of the ramp ring 34 with respect to the inner ring 35 and the washer 57 which are in contact with the ring 34 as well as operations thereof.

Figure 7:
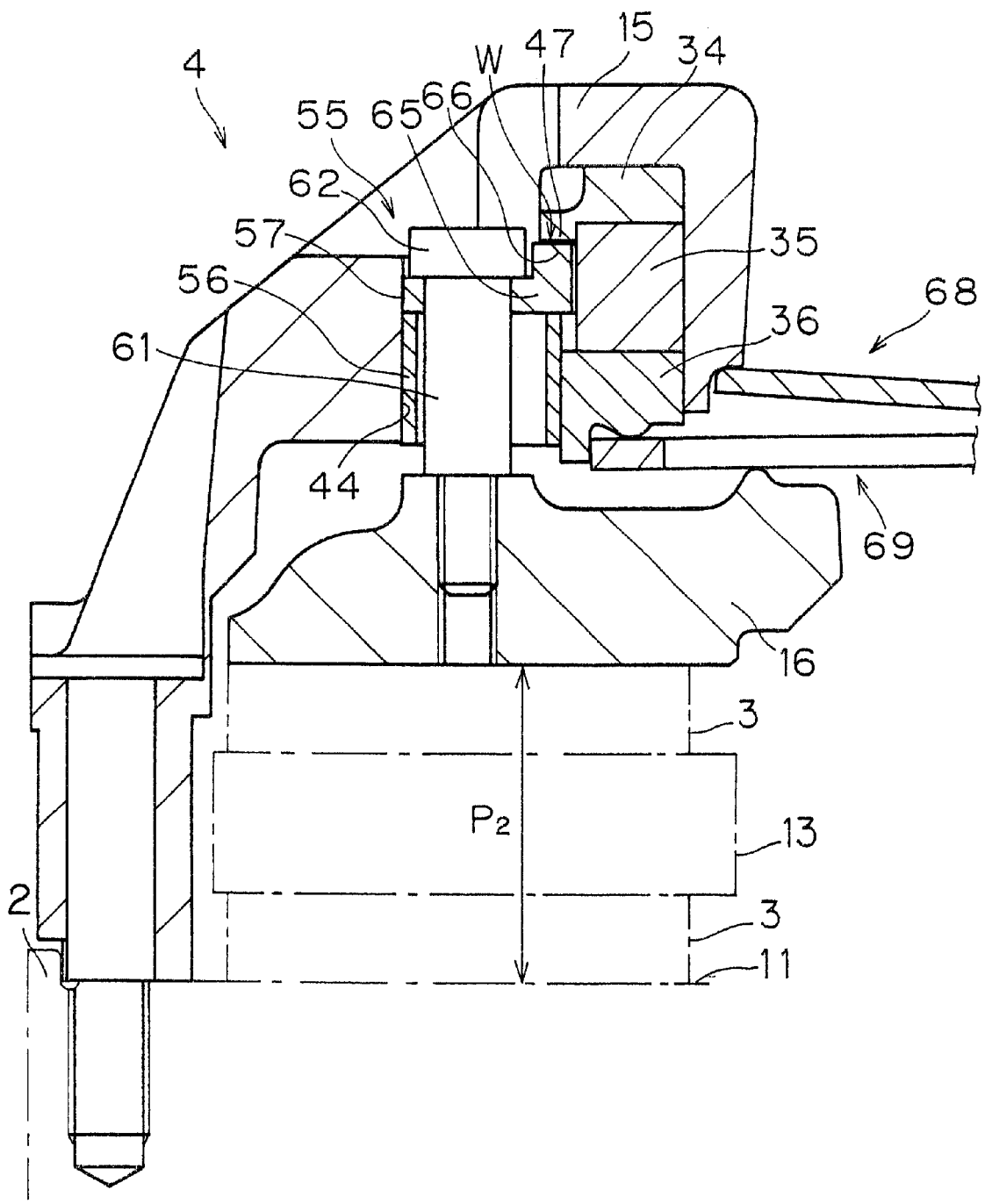
FIG. 7 is a schematic fragmentary cross sectional view showing operations of the wear compensating mechanism of the clutch cover assembly, respectively.

When wear occurs on the clutch disk assembly 3 (friction facing) in the state shown in FIGS. 4 and 11, the pressure plate 16 moves toward the friction surface 11 in accordance with the wear so that the structure enters the state shown in FIGS. 7 and 12. In this operation, the pressure plate 16 and particularly the bolts 55 operating as a part of the plate 16 move the bushings 56 and the washers 57 by the wear amount W toward the flywheel 2 side with respect to the clutch cover 15. Thus, the force acting on the flywheel side of the pressure plate 16 is determined to exceed the static friction force exerted from the clutch cover 15 to the bushings 56. As a result, as shown in FIGS. 7 and 12, a space corresponding to the wear amount W is formed axially between the second complementary inclined surface 66 of the washer 57 and the second inclined surface 47 of the ramp ring 34.

The clutch releasing operation starts from the state shown in FIG. 7. As an operator depresses a clutch pedal, the release fork 87 moves the release device 5 toward the second axial side via the clutch operating mechanism. More specifically, the end of the release fork 87 comes into contact with the engagement portion 86 provided at the outer peripheral wall 85, and thereby moves the whole release device 5 toward the second axial side. In this operation, the radially inner ends of the diaphragm spring 68 and the lever member 69 are moved toward the second axial side. As a result, the pressing force exerted from the lever member 69 to the pressure plate 16 is released, and the pressure plate 16 is moved toward the second axial side by the biasing force applied from the strap plates 27.

Figure 8:
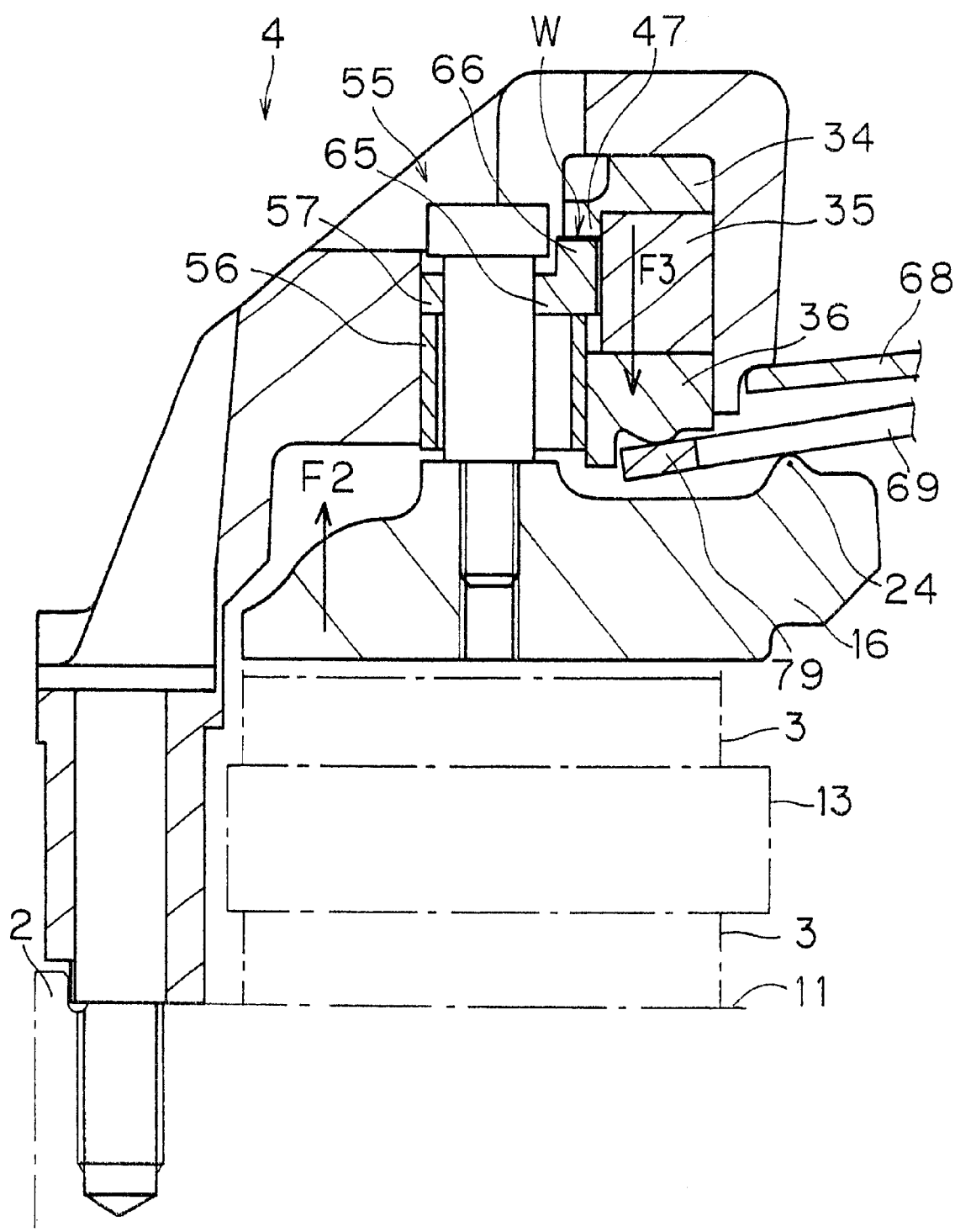
FIG. 8 is a schematic fragmentary cross sectional view showing operations of the wear compensating mechanism of the clutch cover assembly, respectively.

FIG. 8 shows the released state, and more specifically shows the positional relationships between the respective parts of the clutch cover assembly 4 in the state where the release device 5 is located in the end position on the second axial side. In FIG. 8, the support portion 24 of the pressure plate 16 is kept in contact with the lever member 69. Therefore, the biasing force applied from the strap plates 27 acts on the biasing mechanism 31 via the lever member 69. When the clutch device enters the clutch released state shown in FIG. 8, the ramp ring 34 rotates in the R2 direction and thereby moves the inner ring 35 and the support ring 36 in the first axial direction. This is allowed owing to the fact that an axial component F3 of the force acting from the ramp ring 34 to the inner ring 35 is determined to be larger than the biasing force F2 applied from the strap plates 27. As a result, the pressure plate 16 and the fulcrum of the lever member 69 move toward the flywheel 2.

Figure 9:
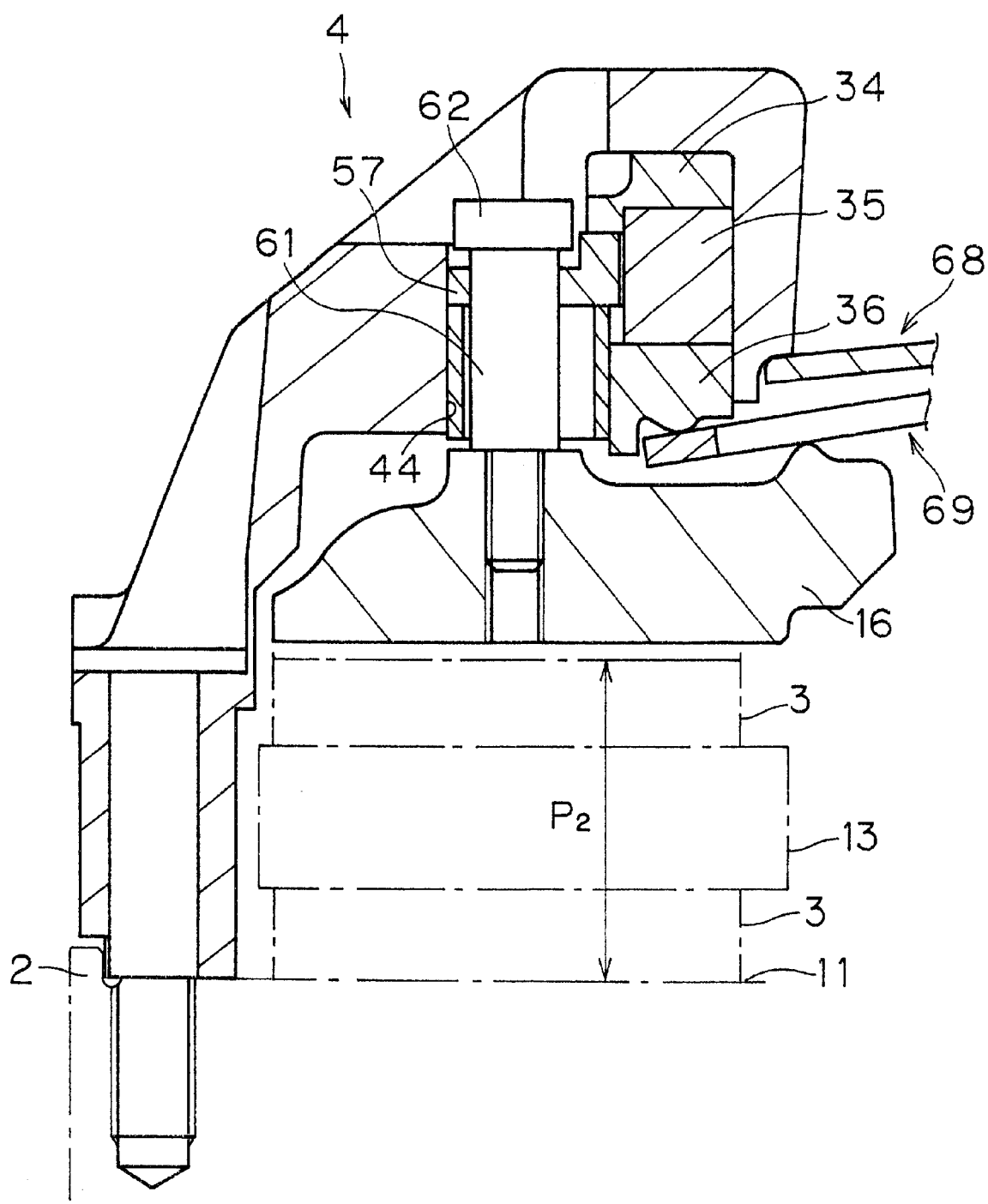
FIG. 9 is a schematic fragmentary cross sectional view showing operations of the wear compensating mechanism of the clutch cover assembly, respectively.

As shown in FIGS. 12 and 13, the rotation of the ramp ring 34 continues until the second inclined surface 47 of the ramp ring 34 comes into contact with the second complementary inclined surface 66 of the washers 57. As shown in FIGS. 9 and 13, when the second inclined surface 47 and the second complementary inclined surface 66 come into contact with each other, the resistance force starts to be applied from the aperture 44 of the clutch cover 15 to the bushings 56 so that rotation of the ramp ring 34 stops. Thus, the inner ring 35 and support ring 36 no longer move in the axial direction.

In the above operation, the inner ring 35 and the support ring 36 axially move the distance S. The distance S is larger than the wear amount W, and is equal to the amount obtained by multiplying the wear amount W by the ratio $\theta_1/\theta_2=(L_1/L_2)\times(r1/r2)$. In this manner, the height of the radially inner end of the lever member 69 can be kept constant. If the amount of movement of the inner ring 35 were equal to the wear amount W, an axial space would occur between the support member and the fulcrum of the lever member after compensation of the wear so that the fulcrum would move toward the clutch cover in the next clutch engaging operation, and the position and attitude of the lever member would change. More specifically, the end (radially inner end) of the lever member 69 would move toward the flywheel.

Figure 10:
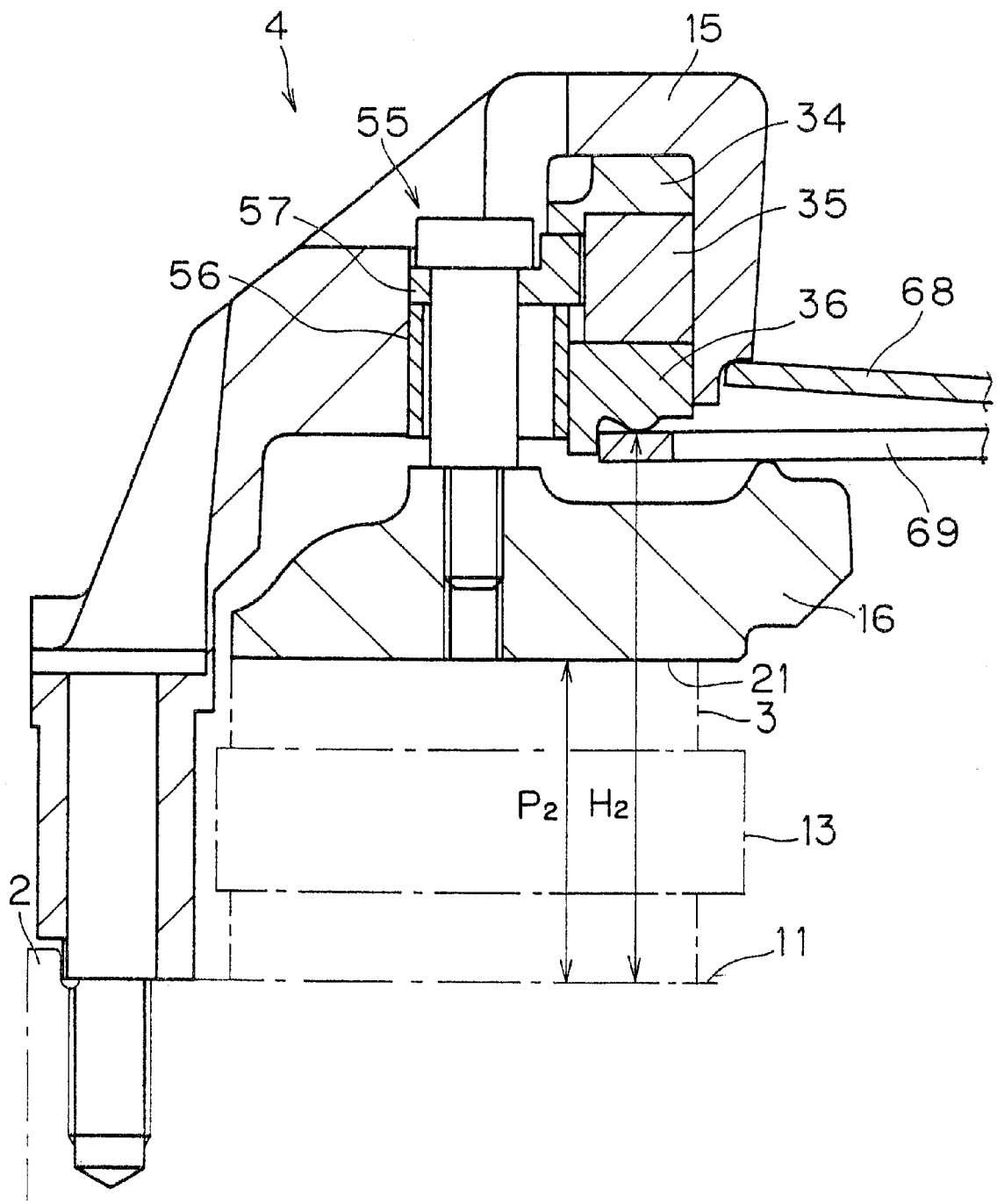
FIG. 10 is a schematic fragmentary cross sectional view showing operation of the wear compensating mechanism of the clutch cover assembly, respectively.

When the clutch engaging operation is performed again in the state shown in FIG. 9, the respective parts enter the state shown in FIG. 10 so that the axial distance between the friction surface 11 and the pressing surface 21 goes to $P_2=P_1-W$, and the axial distance between the support ring 36 and the friction surface 11 goes to $H_2=H_1-S$. However, the axial distance between the friction surface 11 and the power point 78 of the lever member 69 does not change from $H_1$. This means that the axial position of the release device 5 has not changed. More specifically, no change has occurred in axial space between the end of the release fork 87 and the engagement portion 86 of the release device 5 as well as axial space Q between the release device 5 and the clutch brake 6.

As described previously, the movement control mechanism (the stop mechanism 32 and the wear amount detecting mechanism 33) has a detecting function and a movement stopping function. The detecting function detects the amount of wear. The movement stopping function forms the space with respect to the biasing mechanism 31 (more specifically, the ramp ring 34) corresponding to the wear amount. The movement stopping function also restricts the axial movement of the support ring 36 by restricting further rotation when it comes into contact with the ramp ring 34.

In this case, the axial space which allows axial movement of the support ring 36 is formed between the members (the bushings 56 and the washers 57) frictionally engaged with the clutch cover 15 and the biasing mechanism 31 (specifically, the ramp ring 34). Therefore, the following three advantages can be achieved in contrast to the prior art, in which the axial space allowing movement of the support member is formed between the lever member and the pressure plate.

First, the wear control operation is not adversely affected even when the pressure plate 16 receives vibrations from the flywheel 2 side at the instance when the wear control is performed in the clutch releasing operation shown in FIGS. 8 and 9. In the prior art structure, when the pressure plate is shifted toward the flywheel side, the axial space exceeds the desired amount, resulting in over-adjustments, i.e., movement of the support member by an amount exceeding the desired amount.

Secondly, wearing of the clutch brake 6 does not adversely affect the wear control operation. In the prior art, when wear occurs on the clutch brake, the axial space between the lever member and the pressure plate may exceed a desired value due to change in axial position of the release device in the releasing operation. In this case, over-adjustment occurs, and in other words, the support member moves an amount exceeding the desired amount.

Thirdly, it is not essential to bring the pressure plate 16 into contact with the stop mechanism 32 in the clutch releasing operation so that the release stroke of the pressure plate 16 is not restricted. In this embodiment, the axial space is ensured between the pressure plate 16 and the stop mechanism 32 (specifically, the bushings 56) in the clutch releasing operation shown in FIGS. 8 and 9.

As described above, the axial space for allowing the axial movement of the support ring 36 is formed between the members (the bushings 56 and the washers 57) frictionally engaged with the clutch cover 15 and the biasing mechanism 31 (more specifically, the ramp ring 34). Therefore, the axial position of the fulcrum of the lever member 69 can be accurately controlled after wearing. As a result, the height of the end of the lever member 69 can be maintained constant.

The invention is not restricted to the clutch device of the foregoing embodiment. The invention can be applied to various kinds of clutch devices such as a clutch device having only one clutch disk assembly, a clutch device in which the pressing member is formed of only a spring such as a diaphragm spring, a clutch device in which the pressing member is formed of a lever member and another spring, and a clutch device in which the pressing member is pushed toward the flywheel for releasing the clutch. Employment of the clutch brake is not essential.

Second Embodiment

Referring now to FIGS. 14–22, a clutch cover assembly 4 is shown in accordance with a second embodiment, which has the same basic structure as that in the foregoing first embodiment. Specifically, the main difference between the first and second embodiments is that the washers 57 of the first embodiment has been replaced with washers 57' and outer rings 58'. Therefore, the following description will only discuss these differences in the second embodiment, and the portions that are the same or similar to the first embodiment will be described only briefly or will not be described.

Figure 14:
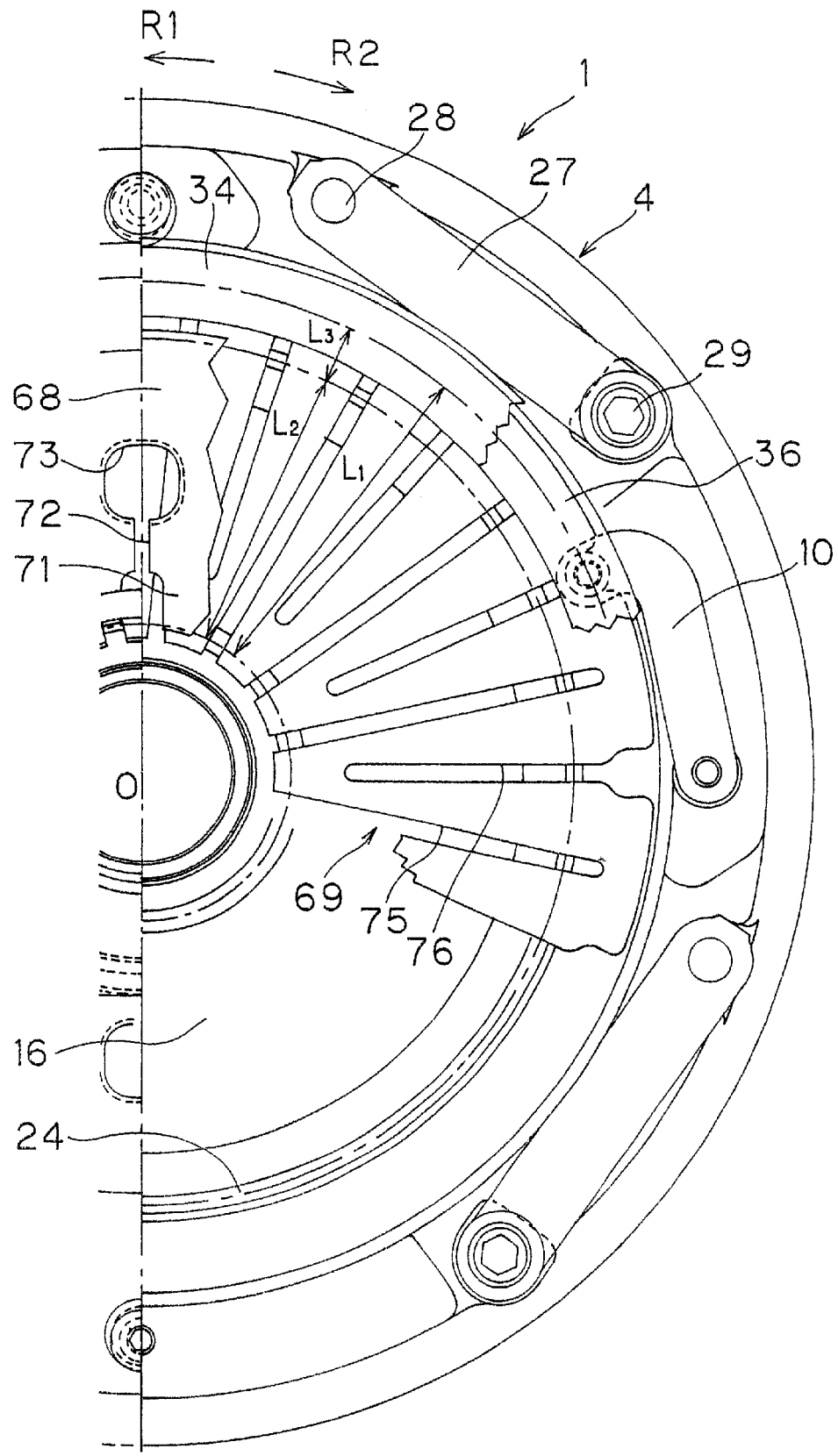
FIG. 14 is a fragmentary elevational view of a clutch device according to a second embodiment of the present invention.

As shown in FIG. 14, the support ring 36 is fixedly coupled to the clutch cover 15 by strap plates 10. Thereby, the support ring 36 and the inner ring 35 are unrotatable and axially movable with respect to clutch cover 15.

Figure 17:
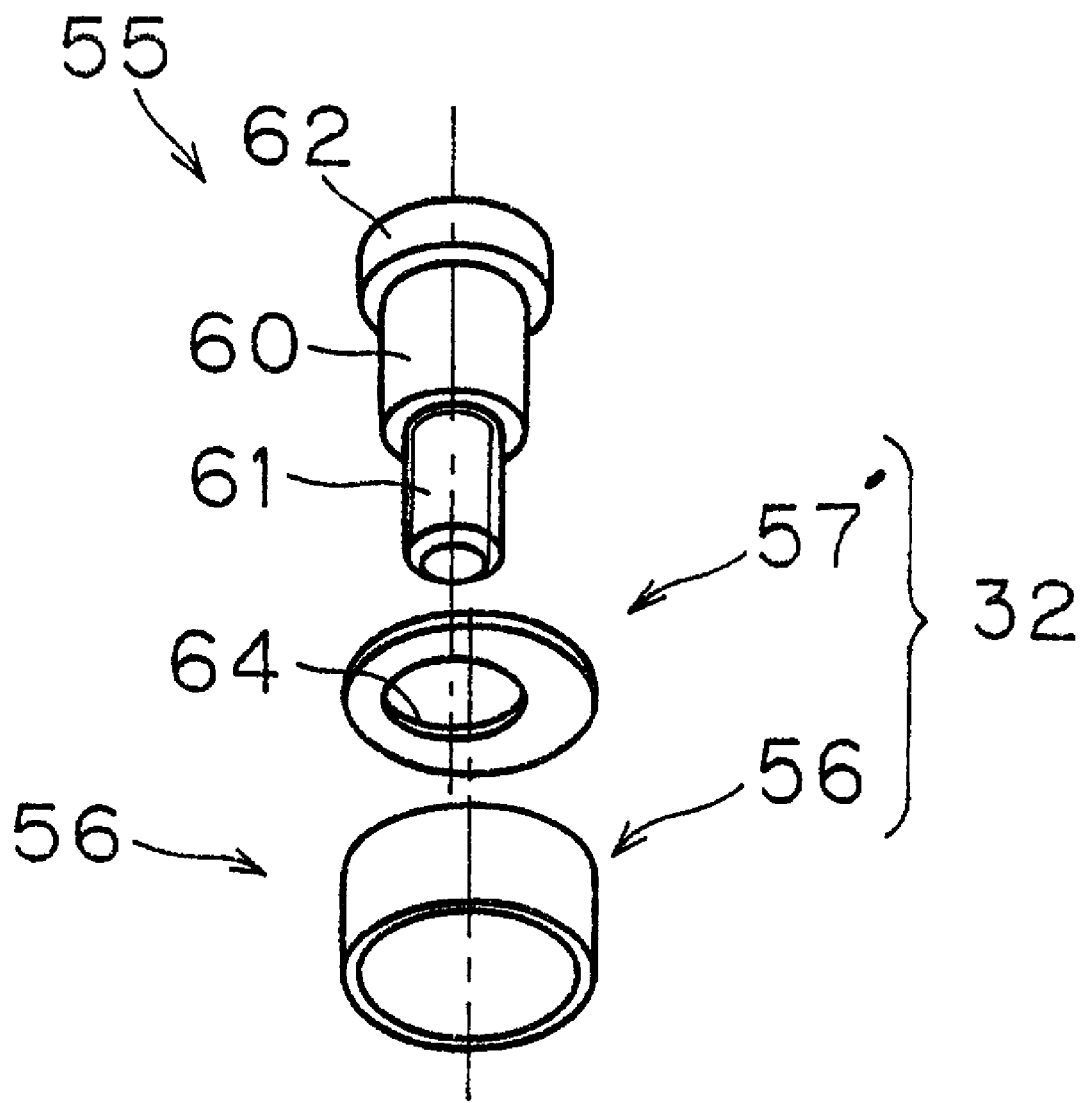
FIG. 17 is an exploded perspective view showing a movement control mechanism in accordance with the second embodiment of the present invention.
Figure 18:
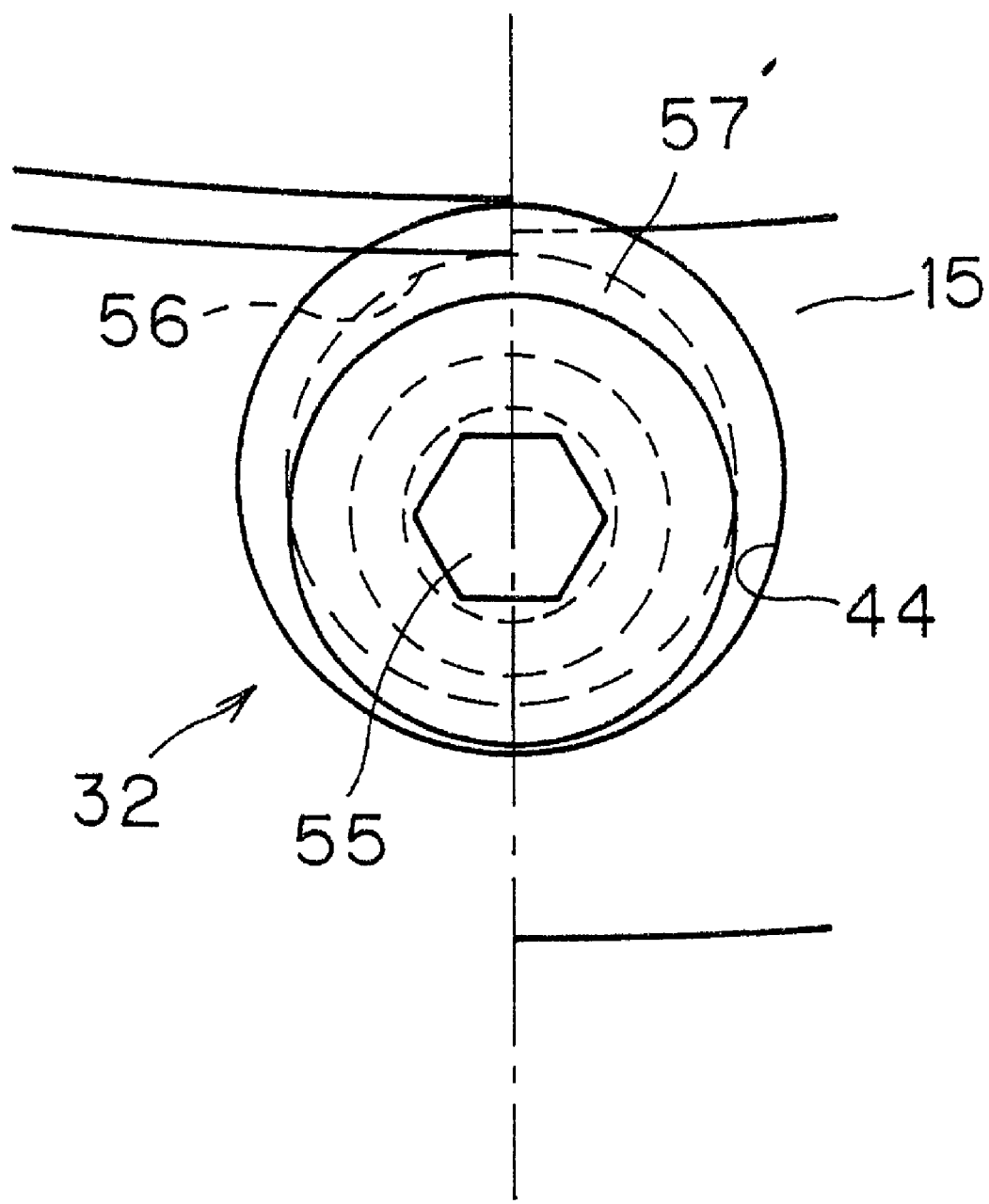
FIG. 18 is an enlarged top view of the movement control mechanism illustrated in FIG. 17 in accordance with the second embodiment of the present invention.

A washer 57' is arranged between the head 62 of the bolt 55 and the bushing 56. As shown in FIGS. 17 and 18, the washer 57' in this embodiment is formed of a flat plate member, and does not have an inclined surface. The washer 57' is provided with an aperture 64 through which the main body of the bolt 55 is inserted as shown in FIG. 17. This aperture 64 is radially shifted from the center of the washer 57'. Thereby, the washer 57' is provided with a portion projected radially inward beyond the head 62 of the bolt 55.

Figure 16:
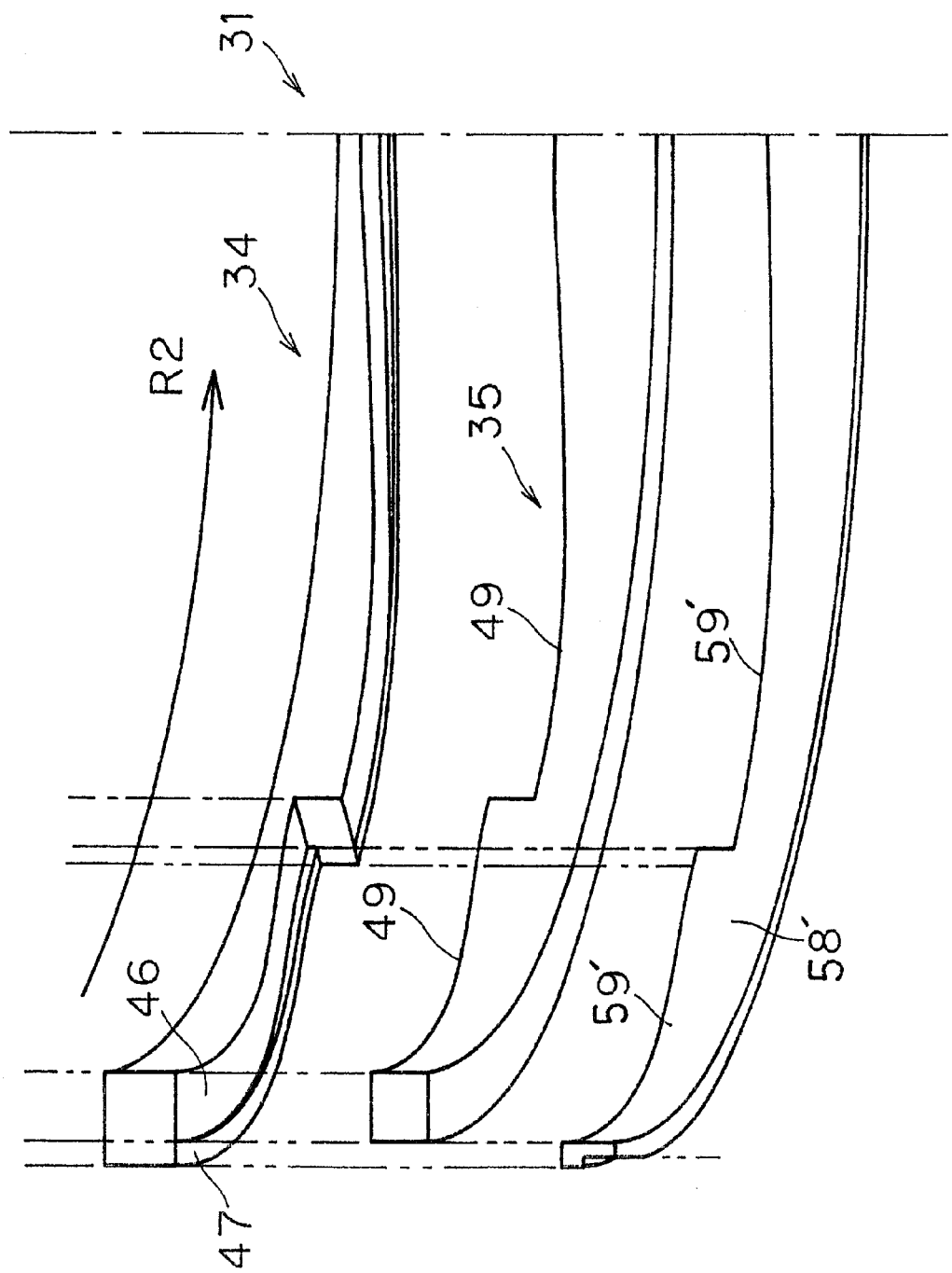
FIG. 16 is an exploded fragmentary perspective view showing structures of the first and second wedge mechanisms.

The outer ring 58' is an annular member arranged radially outside the inner ring 35. As shown in FIG. 16, the outer ring 58' is provided with a plurality of second complementary inclined surfaces 59' which are in complementary contact with the inclined surfaces 47 of the ramp ring 34, respectively. The outer peripheral portion of the outer ring 58' is in contact with the second axial side of the washer 57'. The outer ring 58' is arranged in the groove 7 of the accommodating portion 40, and the outer peripheral surface thereof is supported by the outer peripheral wall 43. The outer ring 58' is engaged, e.g., with the bushing 56, and thereby is unrotatable and axially movable with respect to the clutch cover 15.

In this embodiment, the stop mechanism 32 is formed of the bushing 56, the washer 57', and the outer ring 58', and is axially movably and frictionally engaged with the clutch cover 15. By receiving the force from the biasing mechanism 31, the stop mechanism 32 restricts the movement of the support ring 36. Further, the stop mechanism 32 is moved toward the friction facing by the wear amount detecting mechanism 33 (bolt 55) when wear occurs on the friction facings of the clutch disk assemblies 3.

Figure 15:
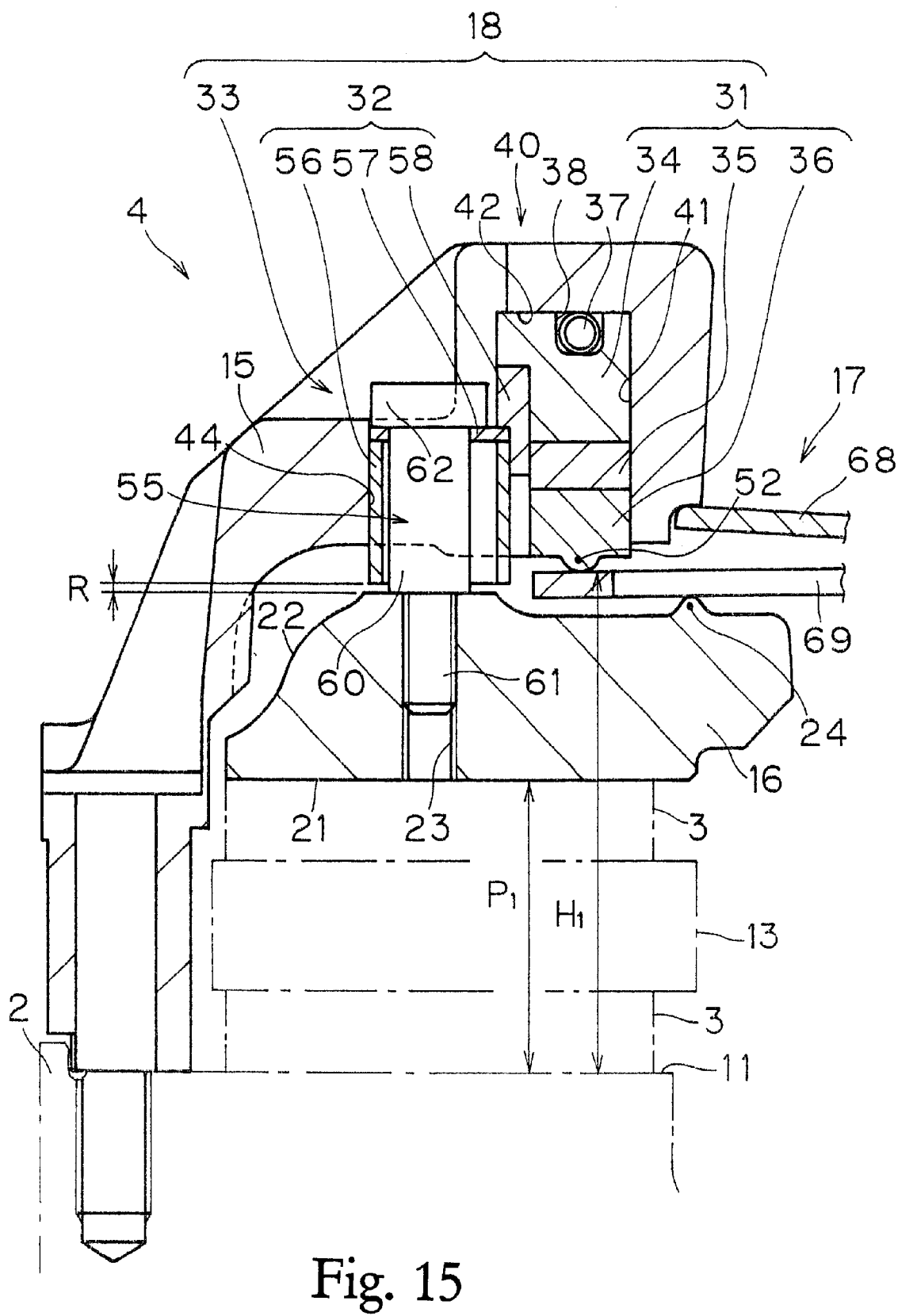
FIG. 15 is a schematic fragmentary cross sectional view of the clutch cover assembly of the second embodiment of the present invention.

In the clutch coupling state shown in FIG. 15, an axial space R is formed between the end surface on the first axial side of the bushing 56 and the opposed surface 22 of the pressure plate 16. This axial space R corresponds to the release stroke of the pressure plate 16, which will be described later.

Figure 19:
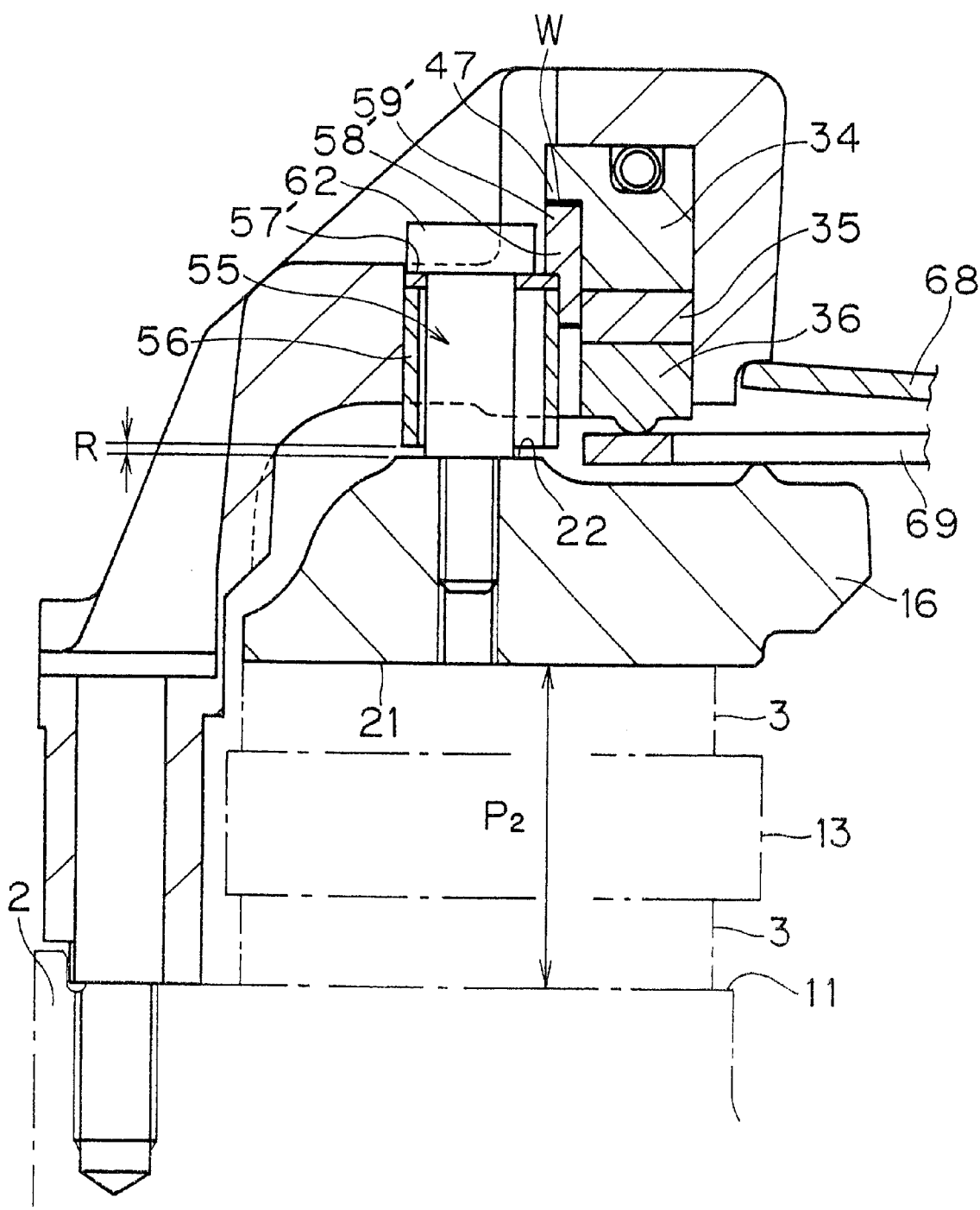
FIG. 19 is a schematic fragmentary cross sectional view showing operations of the wear compensating mechanism of the clutch cover assembly of the second embodiment of the present invention.

When wear occurs in the clutch disk assemblies 3 which is in the state shown in FIG. 15, pressure plate 16 moves toward the flywheel 2 in accordance with the wear. At this time, the pressure plate 16 moves via the bolts 55, which moves together with the pressure plate 16, the bushings 56, and the washers 57' toward the flywheel 2 side. Thereby, the outer rings 58' move toward the flywheel 2, as shown in FIG. 19. The axial space corresponding to the wear amount W is then formed between the second complementary inclined surfaces 59' of the outer rings 58' and the second inclined surface 47 of the ramp ring 34. The space corresponding to the wear amount W may be formed between the outer rings 58' and the washers 57', or may be formed entirely on the axially opposite sides of the outer rings 58'.

When the clutch releasing operation is performed in the state shown in FIG. 19, the pressure plate 16 is moved toward the clutch cover 15 by the biasing force F2 applied from the strap plates 27. As can be seen from the clutch released state shown in FIG. 20, when the opposed surface 22 comes into contact with the end surface on the first axial side of the bushings 56, movement of the pressure plate 16 stops. This means that the maximum resistance applied from the clutch cover 15 to the bushings 56 is larger than the biasing force applied by the strap plates 27. In this state, a predetermined space T 1 is kept between the outer periphery of the lever member 69 and the support ring 36.

Figure 20:
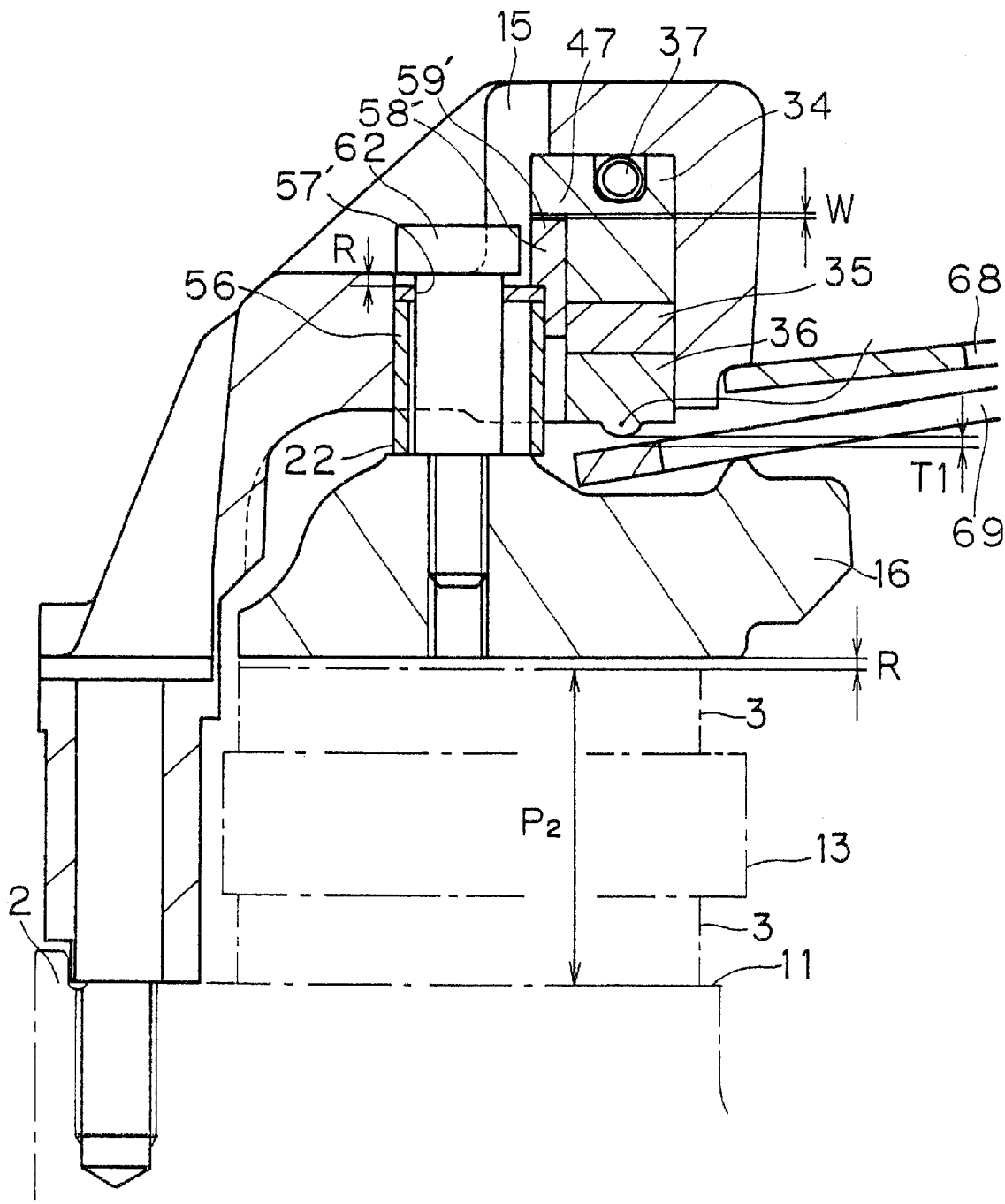
FIG. 20 is a schematic fragmentary cross sectional view showing operations of the wear compensating mechanism of the clutch cover assembly of the second embodiment of the present invention.

Subsequent to the state shown in FIG. 20, the ramp ring 34 is rotated in the R2 direction by the biasing force applied from the coil springs 37 so that the support ring 36 is moved toward the flywheel 2. The ramp ring 34 continues rotation until the second inclined surface 47 of the ramp ring 34 comes into contact with the second complementary inclined surface 59' of the outer rings 58', or until the axial space between the ramp ring 34 and the bushings 56 disappears.

Figure 21:
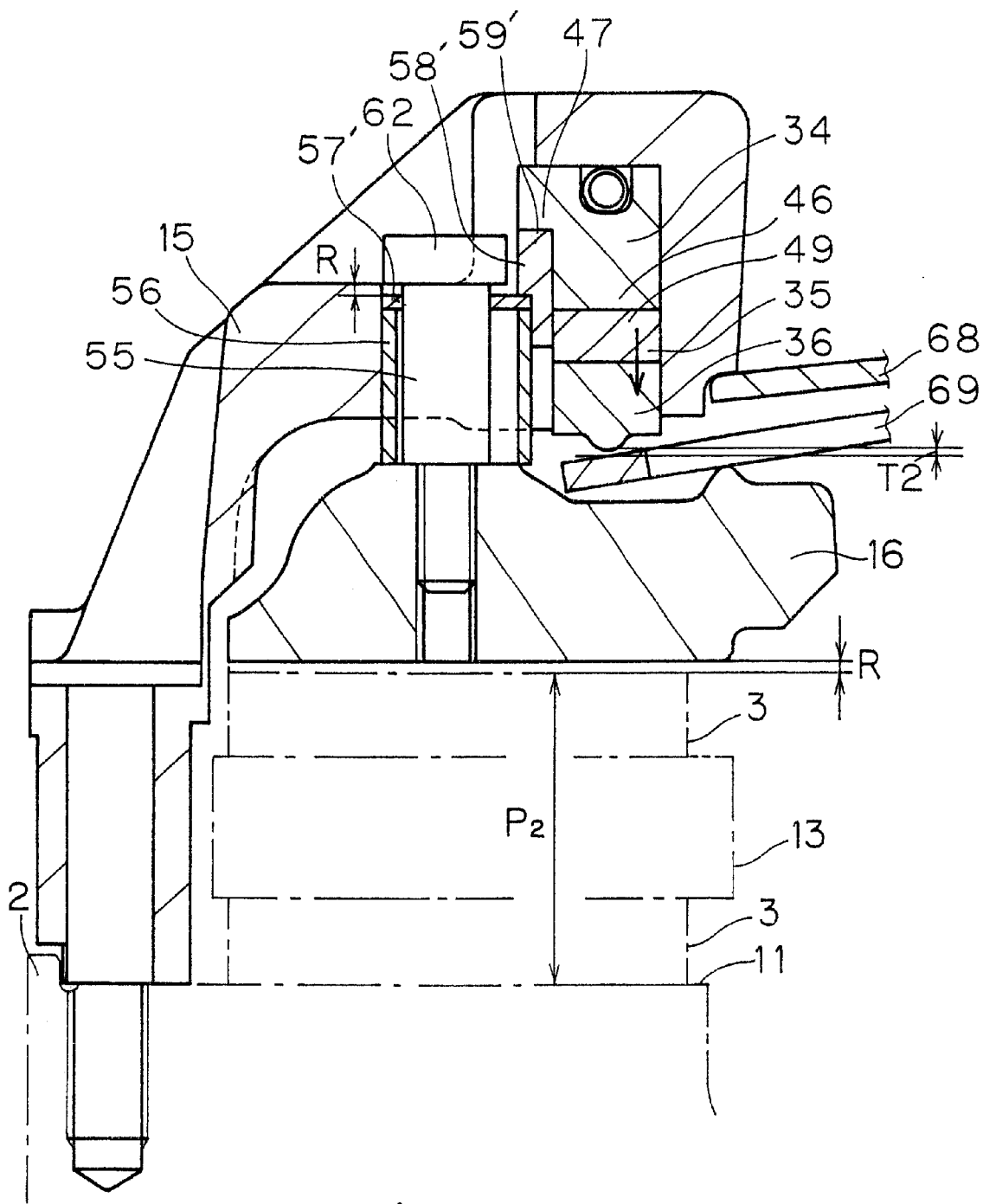
FIG. 21 is a schematic fragmentary cross sectional view showing operations of the wear compensating mechanism of the clutch cover assembly of the second embodiment of the present invention.
Figure 22:
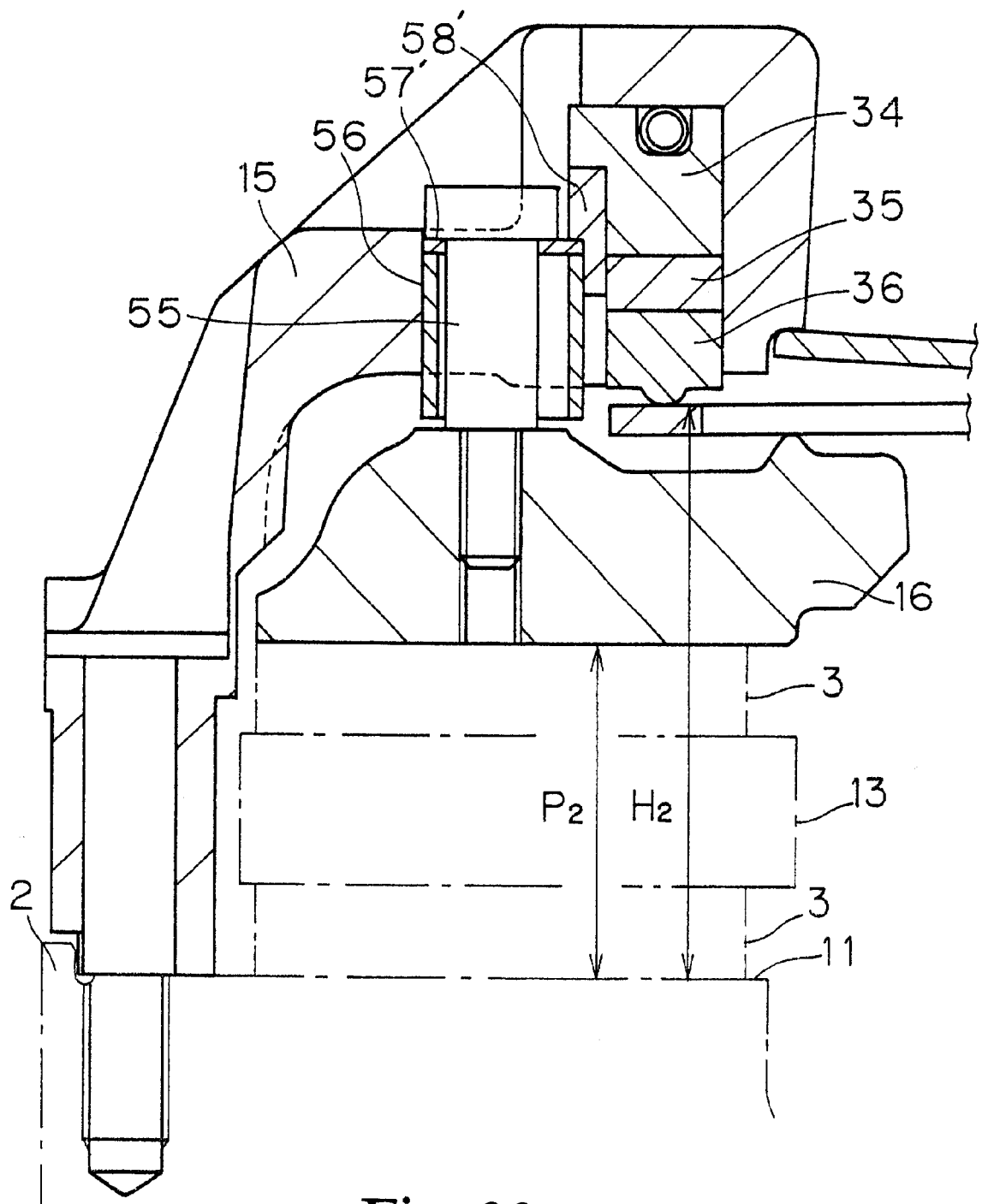
FIG. 22 is a schematic fragmentary cross sectional view showing operations of the wear compensating mechanism of the clutch cover assembly of the second embodiment of the present invention.

In the state shown in FIG. 21, the force exerted from the ramp ring 34 onto the outer rings 58' is received by the clutch cover 15 and the pressure plate 16 via the washers 57' and the bushings 56. Thereby, the ramp ring 34 no longer rotates, and the support ring 36 stops after moving the predetermined distance S. In this state, the space T2 is kept between the support ring 36 and the lever member 69. When the clutch engaging operation is performed again in the state shown in FIG. 21, the device enters the state shown in FIG. 22. In this operation, the axial height $H_1$ of the radially inner end of the lever member 69 does not change so that the no change occurs in attitude of the diaphragm spring 69 and axial position of the release device 5.

As already described, the movement control mechanism (the stop mechanism 32 and the wear amount detecting mechanism 33) has a detecting function, and a movement stopping function. The detecting function detects the amount of wear. The movement stopping function forms the space with respect to the biasing mechanism 31 (more specifically, the ramp ring 34) corresponding to the wear amount. The movement stopping function also restricts the axial movement of the support ring 36 by restricting further rotation when it comes into contact with the ramp ring 34.

In this case, the axial space which allows axial movement of the support ring 36 is formed between the members (the bushings 56 and the washers 57') frictionally engaged with the clutch cover 15 and the biasing mechanism 31 (specifically, the ramp ring 34). Therefore, the following two advantages can be realized in contrast to the prior art, in which the axial space allowing movement of the support member is formed between the lever member and the pressure plate.

First, the wear control operation is not adversely affected even when the pressure plate 16 receives vibrations from the flywheel 2 side at the instance when the wear control is performed in the clutch releasing operation shown in FIGS. 20 and 21. In the prior art structure, when the pressure plate is shifted toward the flywheel side, the axial space exceeds the desired amount, resulting in over-adjustments, i.e., movement of the support member by an amount exceeding the desired amount.

The heads 62 of the bolts 55 are spaced by the space R from the washers 57' of the stop mechanism 32 in the clutch releasing operation shown in FIGS. 20 and 21. Therefore, the bolts 55 do not act on the stop mechanism 32 even when the pressure plate moves toward the flywheel 2.

Secondly, wearing of the clutch brake 6 does not adversely affect the wear control operation. In the prior art, when wear occurs on the clutch brake, the axial space between the lever member and the pressure plate may exceed a desired value due to change in axial position of the release device in the releasing operation. In this case, over-adjustment occurs, and in other words, the support member moves in excess of the desired amount.

As described above, the axial space for allowing the axial movement of the support ring 36 is formed between the members (the bushing 56 and the washer 57') frictionally engaged with the clutch cover 15 and the biasing mechanism 31 (more specifically, the ramp ring 34). Therefore, the position of the fulcrum of the lever member 69 can be accurately controlled after wearing. As a result, the height of the end of the lever member 69 can be maintained at a constant height.

Third Embodiment

Figure 23:
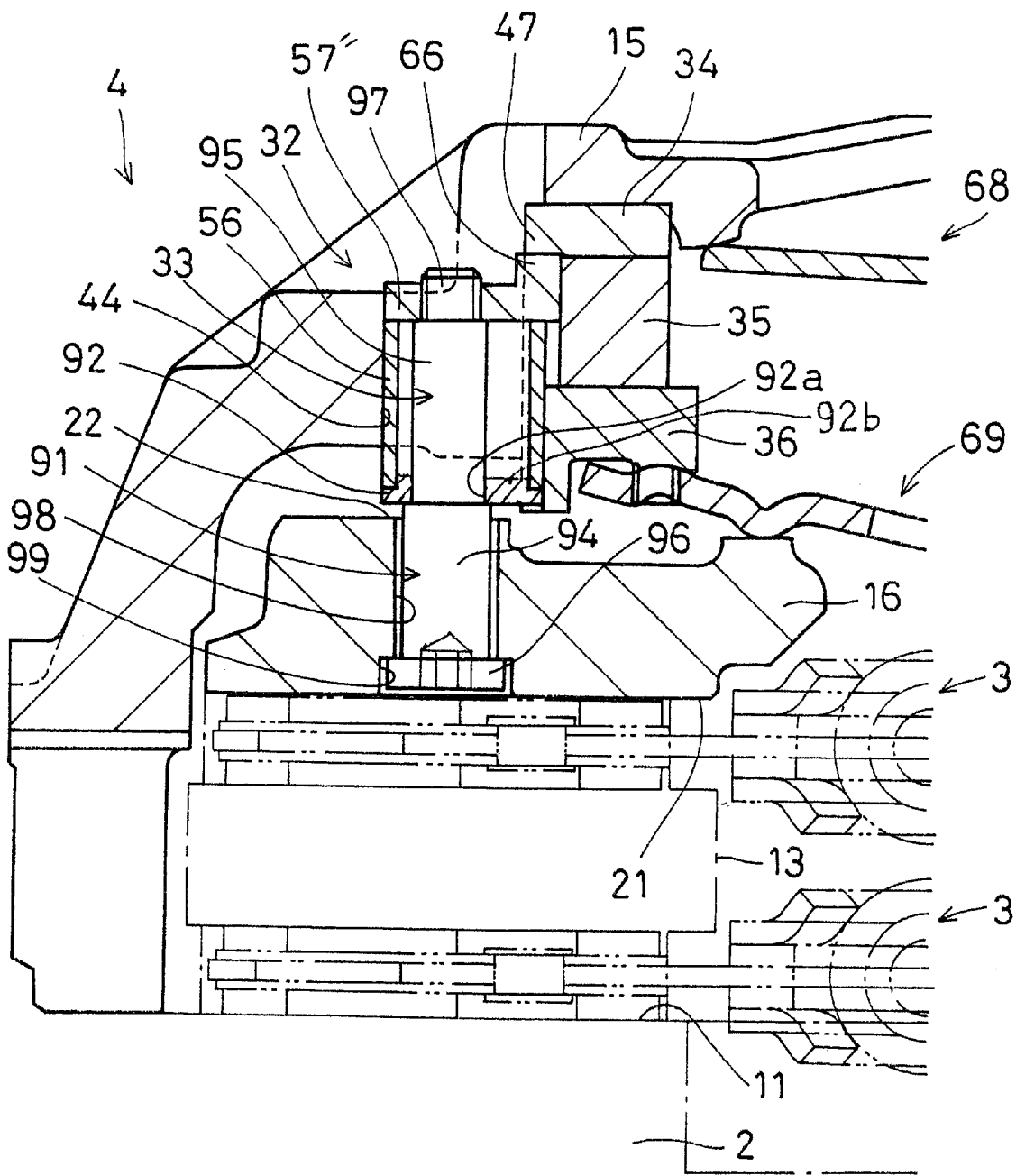
FIG. 23 is a schematic fragmentary cross sectional view of a clutch cover assembly of the third embodiment of the present invention.

Referring now to FIG. 23, a third embodiment is illustrated in accordance with the present invention. Structures and effects of a third embodiment shown in FIG. 23 are substantially the same as those of the first embodiment. Therefore, the following description will only discuss differences in the third embodiment, and the portions that are the same or similar to the first embodiment will not be described.

The wear amount detecting mechanism 33 is provided for moving the stop mechanism 32 toward the clutch disk assemblies 3 with respect to the clutch cover 15 when wear occurs in the clutch disk assemblies 3. In this embodiment, the wear amount detecting mechanism 33 takes the form of a bolt 91. The bolt 91 is formed of a large diameter portion 94, a small diameter portion 95, a head 96 and a threaded portion 97. The head 96 is arranged on the side of pressure plate 16 that faces the flywheel 2 and the head 96, large diameter portion 94, small diameter portion 95 and threaded portion 97 are arranged in this order in the direction of the transmission side of the clutch assembly 4. The large diameter portion 94 is axially movably arranged in the axial aperture 98 formed in the pressure plate 16. The head 96 has a larger diameter than the large diameter portion 94, and is arranged within a concavity 99 formed on an end of the axial aperture 98 near the pressing surface 21. The head 96 is in contact with the end surface of the concavity 99 opposed to the flywheel. Thereby, a force acts on the bolt 91 when the pressure plate 16 moves toward the flywheel 2. However, when the pressure plate 16 moves toward the transmission, no force acts on the bolt 91. Naturally, the head 96 is completely accommodated within the concavity 99, and does not have a portion which axially protrudes beyond the pressing surface 21 toward the engine.

The central position of the bolt 91 is shifted radially outward from the aperture 44. The small diameter portion 95 is primarily arranged within the aperture 44 and is spaced from the bushing 56. The threaded portion 97 is engaged with the washer 57" so that the washer 57" can axially move together with the bolt 91. A second washer 92 is arranged between the end surface on the second axial side of the large diameter portion 94 and the end surface on the first axial side of the bushing 56. The second washer 92 has the same diameter as the bushing 56, and is in contact with the whole end surface on the first axial side of the bushing 56. The second washer 92 has a faucet-joint portion 92b which is in contact with the inner peripheral surface of the bushing 56. The second washer 92 is provided with an aperture 92a through which the small diameter portion 95 extends.

According to the above structure, the bolt 91 is radially and circumferentially unmovable with respect to the bushing 56 owing to the second washer 92. Accordingly, the position of the bolt 91 does not change even when a centrifugal force is applied to the bolt 91.

The second washer 92 can act to move the bolt 91 and the bushing 56 together with each other in axially opposite directions. In this manner, the bolt 91 moves together with the pressure plate 16 only when the pressure plate 16 moves in the first axial direction, and always moves axially together with the stop mechanism 32. Thus, the stop mechanism 32 is subjected to the force when the pressure plate 16 moves in the first axial direction, but is not subjected to the force when the pressure plate 16 moves in the second axial direction.

An axial space corresponding to the release stroke of the pressure plate 16 is maintained between the opposed surface 22 of the pressure plate 16 and the second washer 92.

A description is now given on the wear compensating operation which the clutch cover assembly 4 performs when wear occurs in the clutch disk assemblies 3. When wear occurs on the clutch disk assemblies 3 (friction facings) in the state shown in FIG. 23, the pressure plate 16 moves toward the friction surface 11 in accordance with the wear. In this operation, the pressure plate 16 moves the bolt 91 toward the first axial side, and thereby moves the bushing 56 and the washer 57" by the wear amount W toward the flywheel 2 with respect to the clutch cover 15. Thus, the force which acts on the pressure plate 16 and is directed toward the flywheel is determined to be larger than the static friction force exerted from the clutch cover 15 to the bushing 56. As a result, a space corresponding to the wear amount W is formed axially between the second complementary inclined surface 66 of the washer 57" and the second inclined surface 47 of the ramp ring 34.

The wear compensating operation after the above is the substantially same as those of the first and second embodiments, and therefore will not be discussed. In the clutch released state, however, the pressure plate 16 is in contact with the second washer 92, i.e., the stop mechanism 32 as is done also in the second embodiment. In this state, the bottom surface of the concavity 99 of the pressure plate 16 is located on the second axial side. The bottom surface of the concavity 99 is spaced from the head 96 of the bolt 91 so that the pressure plate 16 can move toward the first axial side with respect to the bolt 91.

When assembling the clutch cover 4, the structures are arranged top side down with respect to the position shown in FIG. 23. Before the assembly, the bolt 91 is fitted into the washer 57" by utilizing the hexagonal hole formed in the head 96 of the bolt 91. Since the head 96 of the bolt 91 is located on the flywheel 2 side, the assembling workability is improved.

In the clutch cover assembly according to the invention, the axial space in which the biasing mechanism can move the fulcrum of the pressing member is formed between the stop mechanism engaged with the clutch cover and the biasing mechanism during the wear compensating operation. Therefore, even if the pressure plate receives vibrations and thereby moves axially during the clutch releasing operation, the displacement of the pressure plate does not change the axial space. Thus, the axial displacement of the fulcrum of the pressing member is kept accurate.

While only several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch cover assembly adapted to be coupled to a flywheel and selectively engaged with a friction member, said clutch cover assembly comprising:
   a clutch cover adapted to be fixedly coupled to the flywheel for rotation therewith, and axially opposed to the friction member, said clutch cover having a fulcrum movably coupled thereto;
   a pressure plate movably coupled to said clutch cover for movement in an axial direction;
   a pressing member supported by said clutch cover for acting on said pressure plate from the clutch cover side; and
   a wear compensating mechanism operatively disposed between said clutch cover and said pressure plate, said wear compensating mechanism being arranged to move said fulcrum on a clutch cover side of said pressing member toward the friction member by an amount corresponding to wear of the friction member during a clutch releasing operation, said wear compensating mechanism having a biasing mechanism, a stop mechanism and a wear amount detecting mechanism, said biasing mechanism biasing said fulcrum toward the friction member, said stop mechanism being frictionally engaged with said clutch cover so as to be axially movable, and arranged to prevent axial movement of said fulcrum by engaging said biasing mechanism, said wear amount detecting mechanism arranged to move said stop mechanism toward the friction member to form an axial space between said stop mechanism and said biasing mechanism when wear occurs on the friction member.

2. A clutch cover assembly adapted to be coupled to a flywheel and selectively engaged with a friction member, said clutch cover assembly comprising:

a clutch cover adapted to be fixedly coupled to the flywheel for rotation therewith, and axially opposed to the friction member, said clutch cover having a fulcrum movably coupled thereto;

a pressure plate movably coupled to said clutch cover for movement in an axial direction;

a pressing member supported by said clutch cover for acting on said pressure plate from the clutch cover side; and a wear compensating mechanism operatively disposed between said clutch cover and said pressure plate, said wear compensating mechanism being arranged to move said fulcrum on a clutch cover side of said pressing member toward the friction member by an amount corresponding to wear of the friction member during a clutch releasing operation, said wear compensating mechanism having a biasing mechanism, a stop mechanism and a wear amount detecting mechanism, said biasing mechanism biasing said fulcrum toward the friction member, said biasing mechanism having a support member for supporting said clutch cover side of said pressing member, and said biasing mechanism having a drive member arranged between said clutch cover and said support member for applying a force to said support member toward the friction member, said stop mechanism being frictionally engaged with said clutch cover so as to be axially movable, and arranged to prevent axial movement of said fulcrum by receiving said biasing mechanism, said stop mechanism bearing an axial load applied from said drive member, and forming an axial space with said drive member in the clutch releasing operation after wear occurs on the friction member, said wear amount detecting mechanism arranged to move said stop mechanism toward the friction member to form an axial space between said stop mechanism and said biasing mechanism when wear occurs on the friction member.

3. A clutch cover assembly according to claim 2, wherein said drive member has a first inclined surface extending in a circumferential direction on a friction facing side that faces away from said clutch cover, said drive member being rotatably supported relative to said clutch cover, said biasing mechanism further has a first inclined portion and a spring, said first inclined portion having a first complementary inclined surface in contact with said first inclined surface of said drive member and being movable together with said support member, said spring biasing said drive member in the rotating direction for urging said first inclined portion and said support member toward the friction member, and said stop mechanism is arranged to inhibit rotation of said drive member until wear occurs on the friction member and then allow rotation of said drive member to move said support member toward said drive member.

4. A clutch cover assembly according to claim 3, wherein said drive member has a second inclined surface on said friction facing side, and said stop mechanism has a second inclined portion having a second complementary inclined surface in contact with said second inclined surface.

5. A clutch cover assembly according to claim 4, wherein said first inclined surface has an angle of inclination that is different from that of said second inclined surface.

6. A clutch cover assembly according to claim 1, wherein said stop mechanism has an engagement member and a stop member, said engagement member being frictionally engaged with said clutch cover so as to be axially movable, said stop member being supported on its friction facing side by said engagement member and being arranged to bear a load applied from said biasing mechanism, and said wear amount detecting mechanism has an engagement portion arranged to move said engagement member toward the friction member when said pressure plate moves toward the friction member due to wear of the friction member.

7. A clutch cover assembly according to claim 2, wherein said stop mechanism has an engagement member and a stop member, said engagement member being frictionally engaged with said clutch cover so as to be axially movable, said stop member being supported on its friction facing side by said engagement member and being arranged to bear a load applied from said biasing mechanism, and said wear amount detecting mechanism has an engagement portion arranged to move said engagement member toward the friction member when said pressure plate moves toward the friction member due to wear of the friction member.

8. A clutch cover assembly according to claim 3, wherein said stop mechanism has an engagement member and a stop member, said engagement member being frictionally engaged with said clutch cover so as to be axially movable, said stop member being supported on its friction facing side by said engagement member and being arranged to bear a load applied from said biasing mechanism, and said wear amount detecting mechanism has an engagement portion arranged to move said engagement member toward the friction member when said pressure plate moves toward the friction member due to wear of the friction member.

9. A clutch cover assembly according to claim 4, wherein said stop mechanism has an engagement member engaged with said clutch cover so as to be axially movable, and supporting a friction facing side of said second inclined portion that faces in a direction toward the friction member, and said wear amount detecting mechanism has an engagement portion arranged to move said engagement member toward the friction facing side when said pressure plate moves toward the friction member due to the wear of the friction member.

10. A clutch cover assembly according to claim 5, wherein said stop mechanism has an engagement member engaged with said clutch cover so as to be axially movable, and supporting a friction facing side of said second inclined portion that faces in a direction toward the friction member, and said wear amount detecting mechanism has an engagement portion arranged to move said engagement member toward the friction facing side when said pressure plate moves toward the friction member due to wear of the friction member.

11. A clutch cover assembly according to claim 9, further comprising a withdrawing member coupling said clutch cover to said pressure plate and biasing said pressure plate away from the friction member, the axial biasing force applied by said biasing mechanism to said support member being larger than the biasing force of said withdrawing member, a resistance exerted from said clutch cover to said stop member occurs so that said support member stops when said biasing mechanism comes into contact with said stop member during the clutch releasing operation after wear occurs on the friction member, and an axial space is secured between said engagement member and said pressure plate while the clutch is disengaged.

12. A clutch cover assembly according to claim 10, further comprising a withdrawing member coupling said clutch cover to said pressure plate and biasing said pressure plate away from the friction member, the axial biasing force applied by said biasing mechanism to said support member being larger than the biasing force of said withdrawing member, a resistance exerted from said clutch cover to said stop member occurs so that said support member stops when said biasing mechanism comes into contact with said stop member during the clutch releasing operation after wear occurs on the friction member, and an axial space is secured between said engagement member and said pressure plate while the clutch is disengaged.

13. A clutch cover assembly adapted to be coupled to a flywheel and selectively engaged with a friction member, said clutch cover assembly comprising:

a clutch cover adapted to be fixedly coupled to the flywheel for rotation therewith, and axially opposed to the friction member;

a pressure plate movably coupled to said clutch cover for movement in an axial direction, said pressure plate having a clutch cover side facing towards said clutch cover;

a lever member axially arranged between said clutch cover and said pressure plate, said lever member having a power point at a radially inner position, a fulcrum point at a radially outer position and an application point, said application point acting on said clutch cover side of said pressure plate;

a spring supported by said clutch cover and arranged to apply a force to said power point of said lever member toward the friction member; and a wear compensating mechanism arranged axially between said lever member and said clutch cover for moving said fulcrum point of said lever member by a distance S toward the friction member when a wear amount W occurs on the friction member, said wear compensating mechanism including a biasing mechanism, a wear amount detecting mechanism, and a movement control mechanism, said biasing mechanism having a support member for supporting a clutch cover side of said fulcrum point of said lever member and a drive member for applying a biasing force to said support member, said wear amount detecting mechanism having a detecting member adjacent a friction member side of said drive member, said detecting member and said drive member forming a space when wear occurs on the friction member with said space corresponding to a wear amount, said movement control mechanism restricting the movement of said support member when no wear occurs on the friction member, and allowing movement of said support member by a distance S before said drive member comes into contact with said detecting member based on said wear amount detected by said wear amount detecting mechanism, said distance S being obtained by multiplying the wear amount W of the friction member by the ratio $L_1/L_2$, where $L_1$ is a distance between said power point and said fulcrum point, and $L_2$ is a distance between said power point and said application point.

14. A clutch cover assembly according to claim 13, wherein said drive member includes circumferentially extending first and second inclined surfaces, with a ratio $\theta 1/\theta 2$ being equal to a value obtained by multiplying ratio $L_1/L_2$ with ratio r1/r2, where θ1 and θ2 are angles of said first and second inclined surfaces and r1 and r2 are mount radiuses of said first and second inclined surfaces, said biasing mechanism further has a spring member for biasing said drive member such that said drive member rotates in the circumferential direction with respect to said support member and said detecting member, and said support member has a first complementary inclined surface which is in complementary contact with said first inclined surface, and said detecting member has a second complementary inclined surface which is in complementary contact with said second inclined surface.

15. A clutch cover assembly according to claim 13, wherein said movement control mechanism has a movement stop mechanism for further stopping movement of said support member when said support member moved by said distance S.

16. A clutch cover assembly according to claim 14, wherein said movement control mechanism has a movement stop mechanism for further stopping movement of said support member when said support member moved by said distance S.

17. A clutch cover assembly according to claim 13, wherein said detecting member frictionally engages said clutch cover so as to be axially movable, and opposes said pressure plate with a predetermined axial space therebetween, with a portion of said pressure plate being adjacent said detecting member from a side farther from the friction member.

18. A clutch cover assembly according to claim 14, wherein said detecting member frictionally engages said clutch cover so as to be axially movable, and opposes said pressure plate with a predetermined axial space therebetween, with a portion of said pressure plate being adjacent said detecting member from a side farther from the friction member.

19. A clutch cover assembly according to claim 13, wherein said detecting member has a first member being in contact with said drive member and a second member being arranged on a friction member side with respect to said first member for supporting a friction member side of said first member, said second member being frictionally engaged with said clutch cover so as to be axially movable, said second member being adapted to receive a load of a portion of said pressure plate applied from a side farther from the friction member, and said second member axially spaced from said pressure plate by a predetermined distance.

20. A clutch cover assembly according to claim 14, wherein said detecting member has a first member being in contact with said drive member and a second member being arranged on a friction member side with respect to said first member for supporting a friction member side of said first member, said second member being frictionally engaged with said clutch cover so as to be axially movable, said second member being adapted to receive a load of a portion of said pressure plate applied from a side farther from the friction member, and said second member axially spaced from said pressure plate by a predetermined distance.

21. A clutch cover assembly according to claim 19, wherein said portion of said pressure plate is a projection extending from said pressure plate away from said friction member and having an end at its tip end, and said second member is a cylindrical member arranged around said projection with a space therebetween, and having an outer peripheral surface frictionally engaged with an aperture formed in said clutch cover.

22. A clutch cover assembly according to claim 20, wherein said portion of said pressure plate is a projection extending from said pressure plate away from said friction member and having an end at its tip end, and said second member is a cylindrical member arranged around said projection with a space therebetween, and having an outer peripheral surface frictionally engaged with an aperture formed in said clutch cover.

* * * * *

UNITED STATES PATENT AND TRADEMARK OFFICE
CERTIFICATE OF CORRECTION

PATENT NO. : 6,264,019 B1
DATED : July 24, 2001
INVENTOR(S) : Hiroshi Uehara

It is certified that error appears in the above-identified patent and that said Letters Patent is hereby corrected as shown below:

<u>Title page,</u>
Foreign Application Priority Data, the foreign application priority date is listed as "Dec. 18, 1999," the priority date should be -- Dec. 18, 1998 --.

Signed and Sealed this

Nineteenth Day of March, 2002

*Attest:*

JAMES E. ROGAN
*Director of the United States Patent and Trademark Office*

*Attesting Officer*